(12) United States Patent
Tao et al.

(10) Patent No.: US 9,628,872 B2
(45) Date of Patent: Apr. 18, 2017

(54) ELECTRONIC DEVICE, STEREOSCOPIC IMAGE INFORMATION TRANSMISSION METHOD OF ELECTRONIC DEVICE AND STEREOSCOPIC INFORMATION RECEIVING METHOD OF ELECTRONIC DEVICE

(75) Inventors: Akihiko Tao, Kanagawa (JP); Takehiko Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 605 days.

(21) Appl. No.: 13/638,793

(22) PCT Filed: Feb. 6, 2012

(86) PCT No.: PCT/JP2012/052648
§ 371 (c)(1),
(2), (4) Date: Oct. 1, 2012

(87) PCT Pub. No.: WO2012/108393
PCT Pub. Date: Aug. 16, 2012

(65) Prior Publication Data
US 2013/0021439 A1    Jan. 24, 2013

(30) Foreign Application Priority Data
Feb. 9, 2011    (JP) ................ 2011-026482

(51) Int. Cl.
*H04N 13/00* (2006.01)
*H04N 21/81* (2011.01)
*H04N 13/04* (2006.01)

(52) U.S. Cl.
CPC ....... *H04N 21/816* (2013.01); *H04N 13/0059* (2013.01); *H04N 13/0066* (2013.01); *H04N 13/0472* (2013.01); *H04N 13/0479* (2013.01)

(58) Field of Classification Search
CPC ............. H04N 21/816; H04N 13/0059; H04N 13/0066; H04N 13/0472
See application file for complete search history.

(56) References Cited

U.S. PATENT DOCUMENTS 8,031,598 B2 *  10/2011  Beshai ................ H04L 12/5695
                                                     370/230.1
8,121,460 B2     2/2012  Sasaki et al.
(Continued)

FOREIGN PATENT DOCUMENTS

CN    101803382 A    8/2010
JP    2000-022743 A  1/2000
(Continued)

OTHER PUBLICATIONS

Office Action from Chinese Application No. 2012-80001902.6, dated Jul. 14, 2014.
(Continued)

*Primary Examiner* — Thai Tran
*Assistant Examiner* — Christopher T Braniff
(74) *Attorney, Agent, or Firm* — Chip Law Group

(57) ABSTRACT

Stereoscopic image information (3D information) can be efficiently transmitted between electronic devices at high speed. Using a capability register (Capability Register) of MHL, the 3D information is transmitted between devices. (1) An MHL sink device transmits a "SET_INT command" immediately after changing the 3D information of the capability register, a 3D_CHG flag of an MHL source device side is set to "1" and the MHL sink device notifies the MHL source device of the 3D information. (2) The MHL source device responds ACK. (3) The MHL source device recognizes that the 3D_CHG flag is set to 1, transmits a "READ_DEVCAP command" in which address information of the 3D information of the capability register is added to the MHL sink device and reads only the 3D information
(Continued)

from the capability register. Using a scratchpad register of MHL, the 3D information is transmitted between the devices and detailed 3D control is performed.

6 Claims, 31 Drawing Sheets

(56) References Cited

U.S. PATENT DOCUMENTS

| | | | |
|---|---|---|---|
| 2003/0161040 A1* | 8/2003 | Ishii | G02B 27/2214 359/463 |
| 2005/0055592 A1* | 3/2005 | Velasco | G06F 1/3203 713/322 |
| 2005/0102491 A1* | 5/2005 | Yamamoto | G06F 9/30043 712/202 |
| 2010/0182402 A1* | 7/2010 | Nakajima | G09G 5/006 348/42 |
| 2010/0289871 A1 | 11/2010 | Tatsuta et al. | |

FOREIGN PATENT DOCUMENTS

| | | |
|---|---|---|
| JP | 2005-332032 A | 12/2005 |
| WO | 2010-146847 A1 | 12/2010 |
| WO | WO2011013036 * | 2/2011 |

OTHER PUBLICATIONS

High-Definition Multimedia Interface Specification Version 1.4, Jun. 5, 2009.
Supplementary Partial European Search Report from EP Application No. 12745048, dated Oct. 4, 2013.

* cited by examiner

FIG. 4

| Resource Name | MSC Offset Range | Max. Size (bytes) | Req'd Size (bytes) | Size in CAP REG | Usage MHL CBUS | |
|---|---|---|---|---|---|---|
| | | | | | Access | Command |
| Capability Registers | 0x00-0x0F | 16 | 16 | N/A | Read | READ_DEVCAP |
| Interrupt Registers | 0x20-0x2F | 16 | 4 | 0x0E[7:4] | Set Bits | SET_INT |
| Status Registers | 0x30-0x3F | 16 | 4 | 0x0E[3:0] | Write | WRITE_STAT |
| Scratchpad Registers | 0x40-0x7F | 64 | 16 | 0x0D | Write | WRITE_BURST |

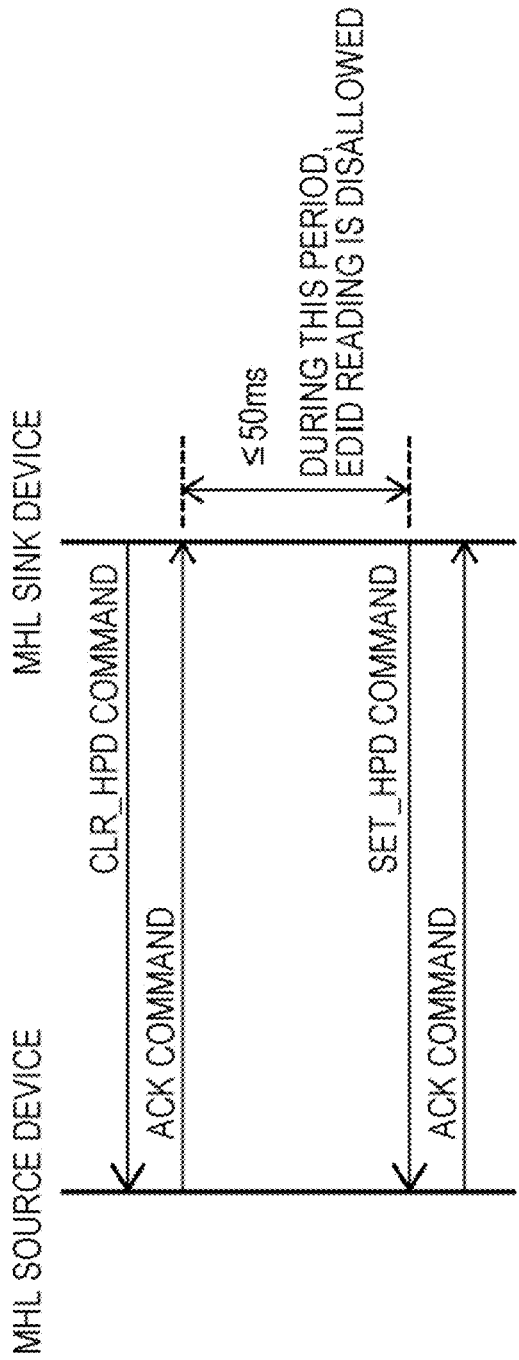

FIG. 8

| Address | Dev Cap Register Name | Definition | Field | Source | Sink | Dongle |
|---|---|---|---|---|---|---|
| 0x00 | DEV_STATE | Identify current connected and powered state. | | X | X | |
| 0x01 | MHL_VERSION | Identify level of MHL Spec supported | | X | X | X |
| 0x02 | DEV_CAT | Identify the type of MHL system. | | | X | X |
| 0x03 | ADOPTER_ID_H | High-order byte of Adopter identifier, assigned by MHL, LLC. | | X | X | X |
| 0x04 | ADOPTER_ID_L | Low-order byte of Adopter identifier, assigned by MHL, LLC. | | X | X | X |
| 0x05 | VID_LINK_MODE | List of link modes supported for video. | SUPP_RGB444 SUPP_YCBCR444 SUPP_YCBCR422 SUPP_PPIXEL SUPP_ISLANDS | X X X X X | X X X X X | X X X X X |
| 0x06 | AUD_LINK_MODE | List of link modes supported for audio. | AUD_2CH AUD_8CH | X X | X X | |
| 0x07 | VIDEO_TYPE | List of video types supported. | | | X | X |
| 0x08 | LOG_DEV_MAP | Map of logical device types. | | X | X | X |
| 0x09 | BANDWIDTH | Upper bound of MHL link bandwidth | | | X | X |
| 0x0A | FEATURE_FLAG | Set flag for each MHL optional feature. | RCP_SUPPORT RAP_SUPPORT SP_SUPPORT | X X X | X X X | X X X |
| 0x0B | DEVICE_ID_H | High-order byte of system (Source, Sink or Dongle device) identifier, assigned by Adopter. | | X | X | X |
| 0x0C | DEVICE_ID_L | Low-order byte of system (Source, Sink or Dongle device) identifier, assigned by Adopter. | | X | X | X |
| 0x0D | SCRATCHPAD_SIZE | Total count of Scratchpad Registers. | | X | X | X |
| 0x0E | INT_STAT_SIZE | Total count of interrupt and status registers. | | X | X | X |
| 0x0F | Reserved for Future Use | | Reserved | | | |

FIG. 10

| Address | Device Interrupt Register Name | Definition |
|---|---|---|
| 0x20 | RCHANGE_INT | Flags a change in Capability or Scratchpad. |
| 0x21 | DCHANGE_INT | Flags a change in EDID. |
| 0x22 TO 0x23 | Reserved for Future Use | |

FIG. 11

| Register Name | | Offset | | |
|---|---|---|---|---|
| RCHANGE_INT | | 0x20 | | |
| Bit | Name | Source | Sink | Notes |
| 0 | DCAP_CHG | X | X | Device Capability Register value changed. |
| 1 | DSCR_CHG | X | X | Device Scratchpad Register value changed. |
| 2 | REQ_WRT | X | X | Request-to-Write. |
| 3 | GRT_WRT | X | X | Grant-to-Write. |
| 4-7 | | | | Reserved. |

FIG. 13

| Address | b7 | b6 | b5 | b4 | b3 | b2 | b1 | b0 |
|---------|----|----|----|----|----|----|----|----|
| 0x0F | 3D_present | Reserved | | | | MHL_3D_LEN | | |
| 0x10 | 2D_VIC_order_1 | | | | 3D_Structure_1 | | 3D_Detail_1 | |
| 0x11 | 2D_VIC_order_2 | | | | 3D_Structure_2 | | 3D_Detail_2 | |
| ---- | ---- | | | | ---- | | ---- | |
| 0x1n | 2D_VIC_order_n | | | | 3D_Structure_n | | 3D_Detail_n | |

FIG. 14

| CONDITION FOR MHL SINK DEVICE WHICH SUPPORTS 3D (EXAMPLE) ALL OF FOLLOWING 3D STRUCTURE AND CORRESPONDING VIDEO FORMATS NEED TO BE SUPPORTED. | | |
|---|---|---|
| 3D structure | MHL SINK DEVICE WHICH CAN RECEIVES 50 Hz | MHL SINK DEVICE WHICH CAN RECEIVES 60 Hz |
| Frame Packing | VIC19 (1280x720p @50 Hz)<br>VIC32 (1920x1080p @23.98/24 Hz) | VIC4 (1280x720p @59.94/60 Hz)<br>VIC32 (1920x1080p @23.98/24 Hz) |
| Side-by-Side | VIC20 (1920x1080i @50 Hz) | VIC5 (1920x1080i @59.94/60 Hz) |
| Top-and-Bottom | VIC19 (1280x720p @50 Hz)<br>VIC32 (1920x1080p @23.98/24 Hz) | VIC4 (1280x720p @59.94/60 Hz)<br>VIC32 (1920x1080p @23.98/24 Hz) |

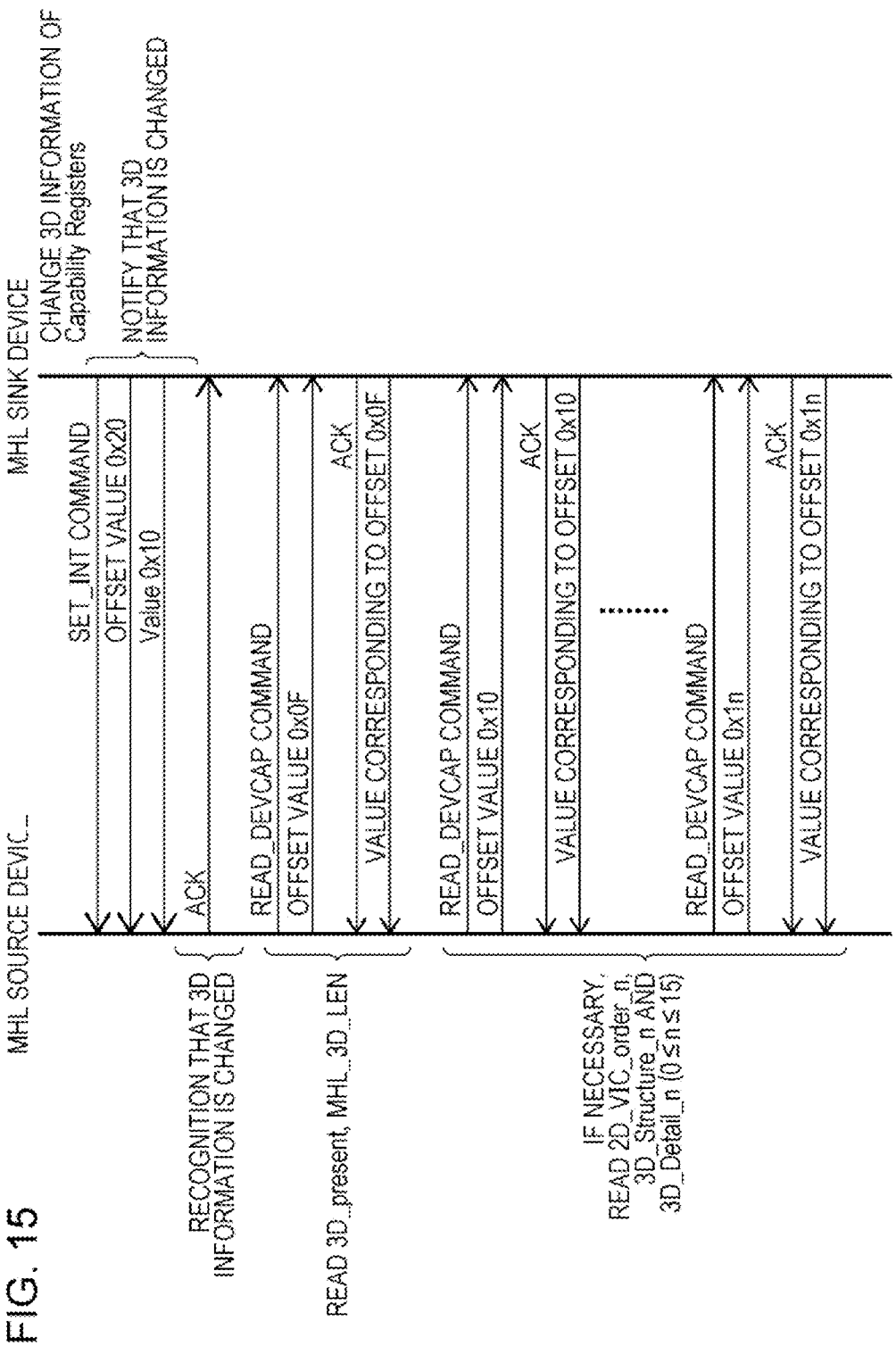

FIG. 17

| BYTE LENGTH | b7 | b6 | b5 | b4 | b3 | b2 | b1 | b0 |
|---|---|---|---|---|---|---|---|---|
| 1 | 3D_ID_CODE (3D Capability) | | | | | | | |
| 2 | 3D_present | Reserved | | | | | | |
| 3 | 2D_VIC_order_1 | | | | 3D_Structure_1 | | 3D_Detail_1 | |
| 4 | 2D_VIC_order_2 | | | | 3D_Structure_2 | | 3D_Detail_2 | |
| ----- | ----- | | | | ----- | | ----- | |
| n+2 | 2D_VIC_order_n | | | | 3D_Structure_n | | 3D_Detail_n | |

| | |
|---|---|
| | MHL_3D_LEN |

FIG. 18

| BYTE LENGTH | b7 | b6 | b5 | b4 | b3 | b2 | b1 | b0 |
|---|---|---|---|---|---|---|---|---|
| 1 | | | | 3D_ID_CODE (3D ON/OFF) | | | | |
| 2 | 3D_ON/OFF | | | Reserved | | | | |

FIG. 19

| BYTE LENGTH | b7 | b6 | b5 | b4 | b3 | b2 | b1 | b0 |
|---|---|---|---|---|---|---|---|---|
| 1 | | Sink Class | | | 3D_ID_CODE (Sink Class) | | | |
| 2 | Reserved | | | | | | | |

000: NOT CORRESPONDING TO 3D
001: 3D GLASSES SYSTEM
010: DIRECT-VIEWING SYSTEM
011: HEAD MOUNT SYSTEM
100 TO 111: Reserved FIG. 22
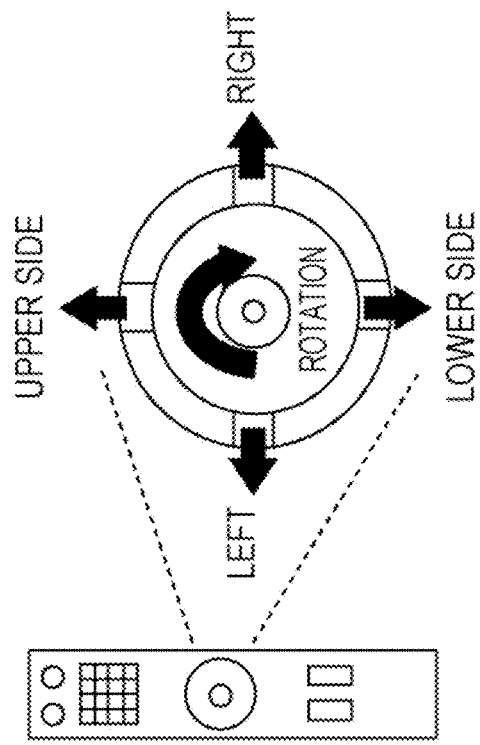
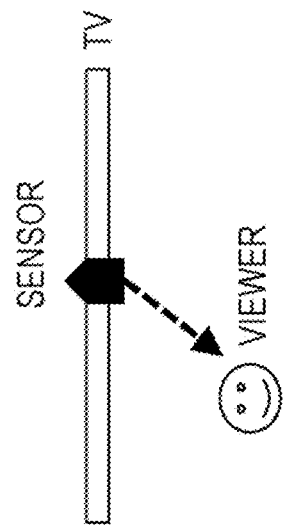

FIG. 23

| BYTE LENGTH | b7 | b6 | b5 | b4 | b3 | b2 | b1 | b0 |
|---|---|---|---|---|---|---|---|---|
| 1 | 3D_ID_CODE (3D Adjust 1) | | | | | | | |
| 2 | DISTANCE r | | | | | | | |
| 3 | VERTICAL ANGLE θ1 (90° TO −90°) | | | | | | | |
| 4 | TRAVERSE ANGLE θ2 (90° TO −90°) | | | | | | | |
| 5 | TORSION ANGLE θ3 (90° TO −90°) | | | | | | | |

FIG. 27

| BYTE LENGTH | b7 | b6 | b5 | b4 | b3 | b2 | b1 | b0 |
|---|---|---|---|---|---|---|---|---|
| 1 | 3D_ID_CODE (3D Adjust2) ||||||||
| 2 | DISTANCE r ||||||||
| 3 | VERTICAL SHIFT AMOUNT OF LENTICULAR LENS (+100% TO −100%) ||||||||
| 4 | TRAVERSE SHIFT AMOUNT OF LENTICULAR LENS (+100% TO −100%) ||||||||
| 5 | TORSION ANGLE OF SHIFT AMOUNT OF LENTICULAR LENS θ (90° TO −90°) ||||||||
| 6 | VERTICAL SHIFT AMOUNT OF IMAGE (+100% TO −100%) ||||||||
| 7 | TRAVERSE SHIFT AMOUNT OF IMAGE (+100% TO −100%) ||||||||
| 8 | TORSION ANGLE OF IMAGE θ (90° TO −90°) ||||||||

FIG. 30

| BYTE LENGTH | b7 | b6 | b5 | b4 | b3 | b2 | b1 | b0 |
|---|---|---|---|---|---|---|---|---|
| 1 | 3D_ID_CODE (Closed Caption) | | | | | | | |
| 2 | SIZE OF CHARACTERS (EXTRA LARGE, LARGE, MEDIUM AND SMALL) | | | | | | | |
| 3 | TRAVERSE DIRECTION OF POINT A (0 TO 255) | | | | | | | |
| 4 | VERTICAL DIRECTION OF POINT A (0 TO 255) | | | | | | | |
| 5 | TRAVERSE DIRECTION OF POINT B (0 TO 255) | | | | | | | |
| 6 | VERTICAL DIRECTION OF POINT B (0 TO 255) | | | | | | | |
| 7 | DEPTH OF POINTS A AND B (0 TO 255) | | | | | | | |

ELECTRONIC DEVICE, STEREOSCOPIC IMAGE INFORMATION TRANSMISSION METHOD OF ELECTRONIC DEVICE AND STEREOSCOPIC INFORMATION RECEIVING METHOD OF ELECTRONIC DEVICE

CROSS-REFERENCE TO RELATED APPLICATION

The present application is a national phase entry under 35 U.S.C. §371 of International Application No. PCT/JP2012/052648 filed Feb. 6, 2012, published on Aug. 16, 2012 as WO 2012/108393 A1, which claims priority from Japanese Patent Application No. JP 2011-026482 filed in the Japanese Patent Office on Feb. 9, 2011.

TECHNICAL FIELD

The present invention relates to an electronic device, stereoscopic image information transmission method of the electronic device and stereoscopic information receiving method of the electronic device, and in particular, to an electronic device which constitutes an image display system for stereoscopic image display.

BACKGROUND ART

In recent years, for example, digital interfaces such as HDMI (High Definition Multimedia Interface) have been widely used as a communication interface for sending data of images or voices from source devices to sink devices at high speed. The source devices are, for example, a mobile phone, a game machine, a DVD (Digital Versatile Disc) recorder or a set-top box, and in addition to the above, there is an AV source (Audio Visual source). The sink devices are, for example, a television receiver, a projector and in addition to the above there is a display. For example, detailed description regarding HDMI Standards is disclosed in NPL.

CITATION LIST

Non Patent Literature

NPL 1: High-Definition Multimedia Interface Specification Version 1.4, Jun. 5, 2009

SUMMARY OF INVENTION

Technical Problem

In HDMI, 3D capability transmission means of a sink device is transmitted to a source device in EDID (Enhanced Extended Display Identification Data). Regarding the transmission means, there are the following problems.

(1) When the sink device and the source device are linked to each other, in a case where a change is generated in a 3D capability of the sink device side, the source device needs to read at least an EDID 2 block (256 bytes) every time, including information in addition to 3D information. If the information is only the 3D information, it is necessary to transmit only several bytes to ten-odd bytes, however, with respect to the above, since the transmission becomes lengthy and excessive power consumption is incurred in reading, the transmission means is unsuitable for a mobile device which is driven by a battery.

(2) In a case where a change is generated in EDID, the sink device generates a low pulse of minimum 100 ms length as an HPD (Hot Plug Detect) signal and the change is notified to the source device. That is, since a change occurs in the sink device side, at least 100 ms until the source device may be recognized and a time for recognizing 3D information by reading EDID is added and causes a time lag which affects response of the source device.

In addition, in HDMI, as means for transmitting 3D information between a sink device and a source device, there are only EDID for transmission from the sink device to the source device and HDMI Vendor Specific InfoFrame for transmission from the source device to the sink device. In order to sufficiently achieve 3D functions, means for transmitting a variety of 3D information at high speed in mutual directions is further necessary. However, in current HDMI, the means as described above has not been defined yet.

An object of the present technique is to enable stereoscopic image information (3D information) to be efficiently transmitted between electronic devices at high speed.

Solution to Problem

According to an aspect of the present technique, the present invention provides an electronic device which includes a register to which function information is written in advance; a change notification transmission unit which, when there is a change in stereoscopic image information written in the register, transmits change notification to an external device; a read command receiving unit which receives a read command transmitted from the external device according to the change notification transmitted from the change notification transmission unit and address information of the stereoscopic image information in the register; and a stereoscopic image information transmission unit which reads the stereoscopic image information from the address in the register corresponding to the address information received in the read command receiving unit and transmits the stereoscopic image information to the external device.

In the present invention, a register is provided which writes a variety of function information in advance including the stereoscopic image information (3D information). When a change is generated in the stereoscopic image information written in the register, change notification is transmitted to the external device by the change notification transmission unit. In response to the transmission of the change notification, the read command and the address information of the stereoscopic image information in the register are transmitted from the external device.

The read command and the address information are received by the read command receiving unit. Then, by the stereoscopic image information receiving unit, the stereoscopic image information is read from the address of register corresponding to the address information and is transmitted to the external device. In the present invention, for example, the stereoscopic image information includes information of a structure and a video format of stereoscopic image data which can be managed by itself.

As described above, in the present invention, when a change is generated in the stereoscopic image information written in the register, when the change notification is transmitted to the external device, on the basis of the read command transmitted from the external device in response to the change notification the changed stereoscopic image information is immediately transmitted to the external device. In this case, based on the address information from the external device, only the stereoscopic image information is read from the register and is transmitted to the external device. Therefore, the stereoscopic image information can be efficiently transmitted to the external device at high speed.

In addition, according to the another aspect of the present invention, the present invention provides an electronic device which includes a change notification receiving unit which receives change notification of stereoscopic image information notified from an external device having a register to which function information is written in advance; a read command transmission unit which transmits a read command and address information of the stereoscopic image information in the register to the external device according to the change notification received in the change notification receiving unit; and a stereoscopic image information receiving unit which receives the stereoscopic image information read and transmitted from the register in the external device corresponding to the read command transmitted from the read command transmission unit and the address information of the stereoscopic image information transmitted from the read command transmission unit.

In the present technique, the external device includes the register which writes the function information in advance. When a change is generated in the stereoscopic image information (3D information) which is written in the register, the change notification is transmitted from the external device. The change notification is received by the change notification receiving unit. In response to the change notification, the read command and the address information of the stereoscopic image information in the register are transmitted by the command transmission unit.

The stereoscopic image information is read from the address in the register corresponding to the address information and is transmitted from the external device. As described above, the stereoscopic image information transmitted from the external device is received by the stereoscopic image information receiving unit. In the present technique, for example, in the stereoscopic image information, information of a structure and a video format of stereoscopic image data which can be managed by the external device are included.

As can be seen from the above, in the present invention, when a change is generated in the stereoscopic image information written in the register in the external device, the change notification is transmitted from the external device, and by transmitting the read command to the external device, the changed stereoscopic image information is immediately transmitted from the external device. Then, in this case, on the basis of the address information which is transmitted to the external device, in the external device, only the stereoscopic image information is read from the register and is transmitted. Therefore, the stereoscopic image information can be efficiently received from the external device at high speed.

In addition, according to another aspect of the present technique, the present invention provides an electronic device which includes a write request transmission unit which transmits a write request of stereoscopic image information to an external device having a register in which the stereoscopic image information can be written; a write permission receiving unit which receives write permission transmitted from the external device corresponding to the write request transmitted from the write request transmission unit; and a stereoscopic image information transmission unit which transmits a write command, address information of the stereoscopic image information in the register and the stereoscopic image information to the external device in accordance with the write permission received in the write permission receiving unit.

In the present technique, the register which writes a variety of function information in advance including the stereoscopic image information (3D information) is included in the external device. The write request of the stereoscopic image information is transmitted to the external device by the write request transmission unit. In response to the write request, the write permission is transmitted from the external device. The write permission is received by the write permission receiving unit. In response to the write permission, the write command, the address information of the stereoscopic image information in the register and the stereoscopic image information are transmitted to the external device by the stereoscopic image information transmission unit. In the external device, the write command which is transmitted as described above, the address information of the stereoscopic image information in the register and the stereoscopic image information are received and the stereoscopic image information is written in the address in the register corresponding to the address information.

In the present technique, for example, in the stereoscopic image information which is transmitted to the external device, information of a structure and a video format of stereoscopic image data which can be managed by itself is included. Moreover, in the present technique, for example, a stereoscopic image display unit is further included and in the stereoscopic image information which is transmitted to the external device, information of a stereoscopic image information display system of the stereoscopic image information display unit is included. In addition, in the present technique, for example, a stereoscopic image information display unit is further included and in the stereoscopic image information which is transmitted to the external device, location information of an observer of the stereoscopic image display unit is included in the stereoscopic image information which is transmitted to the external device.

In addition, in the present technique, for example, the external device further includes a stereoscopic image information display unit. Moreover, in the present technique, for example, the external device includes a stereoscopic image display unit in which a lenticular lens is arranged on a display screen and either information of the shift amount and a rotational angle of the lenticular lens in vertical and traverse directions or information of the shift amount and a rotational angle of an image in vertical and traverse directions, or both are included in the stereoscopic image information which is transmitted to the external device.

Moreover, in the present technique, for example, the external device includes a stereoscopic image display unit and information of a display location of subtitles is included in the stereoscopic image information which is transmitted to the external device. In addition, in the present technique, for example, stereoscopic image display unit which causes a stereoscopic image to be perceived using shutter glasses, ON/OFF information of the stereoscopic image is included in the stereoscopic image information which is transmitted to the external device.

Moreover, in the present technique for example, the external device includes stereoscopic image display unit which causes a stereoscopic image perceived using shutter glasses and ON/OFF information of the stereoscopic image is included in the stereoscopic image information which transmitted to the external device. In addition, in the present invention, for example, the electronic device further includes an image data transmission unit which transmits stereoscopic image data to the external device and information of a structure and a video format of the stereoscopic image data is included in the stereoscopic image information which is transmitted to the external device.

As described above, in the present invention, the write request is transmitted to the external device and when the write permission is received from the external device corresponding to the above, the stereoscopic image information (3D information) is transmitted to the external device. Therefore, the stereoscopic image information can be efficiently transmitted to the external device at high speed.

In addition, according to still another aspect of the present technique, the present technique provides an electronic device which includes a register in which stereoscopic image information can be written; a write request receiving unit which receives a write request of the stereoscopic image information to the register from an external device; a write permission transmission unit which transmits write permission to the external device according to the write request received in the write request receiving unit; and a write control unit which receives a write command transmitted from the external device, address information of the stereoscopic image information in the register and the stereoscopic image information according to the write permission transmitted from the write permission transmission unit and writes the received stereoscopic image information on an address in the register corresponding to the received address information.

In the present technique, the electronic device includes a register capable of writing the stereoscopic image information. By the write request receiving unit, the write request of the stereoscopic image information which is transmitted from the external device is received. In response to the write information, the write permission is transmitted to the external device by the write permission transmission unit. In response to the write permission, from the external device, the write command, the address information of the stereoscopic image information in the register and the stereoscopic image information are transmitted. Then, the write command, the address information of the stereoscopic image information in the register and the stereoscopic image information are received by the write control unit and the stereoscopic image information is written in the address in the register corresponding to the address information.

As described above, in the present invention, when the write request is transmitted from the external device, by transmitting the write permission to the external device, the stereoscopic image information (3D information) is immediately transmitted from the external device. Therefore, the stereoscopic image can be efficiently received from the external device at high speed.

Advantageous Effects of Invention

According to the present technique, stereoscopic image information (3D information) can be efficiently transmitted between electronic devices at high speed.

BRIEF DESCRIPTION OF DRAWINGS

FIG. 4 is a diagram of a configuration of a register used for MHL.

FIG. 7 is a diagram which illustrates that in MHL, a process corresponding to lowering (L) of the HPD line of HDMI is simulated using an MSC command and a time corresponding to the lowering the HDP line is made to be 50 ms or more.

FIG. 8 is a diagram of a state of parameter allocation of current capability register (Capability Registers) of MHL.

FIG. 10 is a diagram of a configuration of an interrupt register (Device Interrupt Registers).

FIG. 11 is a diagram of a detail of "RCAHNGE_INT Register" of "address 0x20" of the interrupt register.

FIG. 13 is a diagram of an example of parameters regarding 3D information transmitted from the MHL sink device to the MHL source device.

FIG. 14 is a diagram of a 3D mandatory format which is supported by the MHL sink device.

FIG. 15 is a sequence diagram of a procedure which allows the MHL source device to read the 3D information of the MHL sink device.

FIG. 17 is a diagram of an example of the 3D information transmitted from the MHL sink device to the MHL source device using the transmission method using the scratchpad register (Scratchpad Registers).

FIG. 18 is a diagram of an example of 3D ON and OFF information which is transmitted from the MHL sink device to the MHL source device.

FIG. 19 is a diagram of an example of information which is transmitted in order to notify the MHL source device of a 3D display method by the MHL sink device.

FIG. 22 is a diagram for explaining that in a case where it is not easy to detect the face location of the observer using a location detection sensor, the correction is carried out by a manual operation using for example a vertical and traverse direction button rotation button of a television remote controller.

FIG. 23 is a diagram of an example of information which is transmitted from the MHL sink device to the MHL source device in a case where input of location information using the location detection sensor (face detection sensor) or the remote controller is carried out by the MHL sink device and the correction process is carried out by the MHL source device.

FIG. 27 is a diagram of an example of information which is transmitted from the MHL source device to the MHL sink device in a case where the input of the location information using the location detection sensor (face detection sensor) or the remote controller is carried out by the MHL source device and the correction process is carried out by the MHL sink device.

FIG. 30 is a diagram of an example of information which is transmitted from the MHL sink device to the MHL source device in a case where an AV stream including the closed caption (CC) is transmitted from the MHL source device.

DESCRIPTION OF EMBODIMENTS

Hereinafter, an aspect (hereinafter, referred to as embodiment) for executing the present invention is described. Here, description is performed as below order.

1. Embodiments
2. Modifications

<1. Embodiment>
[Image Display System]

Figure 1:
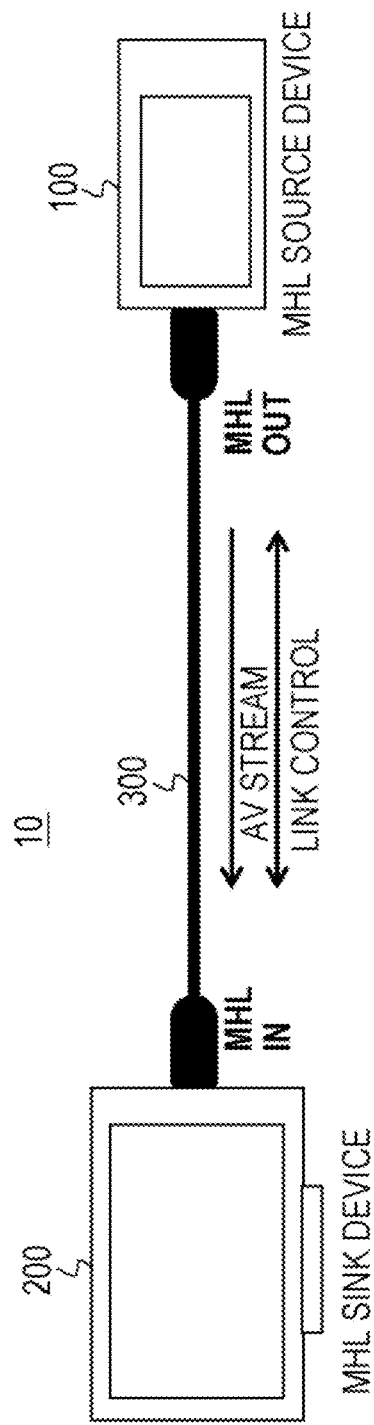
FIG. 1 is a block diagram of a configuration example of an image display system of an embodiment according to the present technique.

FIG. 1 illustrates a configuration example of an image display system 10 for displaying a stereoscopic image (3D image) as an embodiment. The image display system 10 is configured of a mobile phone (Mobile Phone) 100 as an MHL (Mobile High-definition Link) source device and a television receiver 200 as an MHL sink device. These devices are connected through an MHL cable 300.

An outline of MHL is described. Mainly, MHL is AV (Audio Visual) digital interface Standards for a mobile device. In MHL, the MHL source device is connected to the MHL sink device through the MHL cable and contents such as moving images, still images, voices of the MHL source device are reproduced in the MHL sink device (AV stream single direction). In addition, between the devices, control of EDID reading, HDCP authentication, register reading/writing, remote control or the like is carried out (remote control both direction) by transmitting and receiving a DDC command and an MSC (MHL Sideband channel) (remote controller mutual directions).

In the image display system 10, it is possible to perform transmission of information, that is, stereoscopic image information (hereinafter, appropriately referred to as "3D information") regarding 3D between the mobile phone 100 and the television receiver 200 and perform detailed processes. In the image display system 10, a scratchpad register (Scratchpad Register) or a capability register (Capability Register) is used in order to transmit the 3D information. The details of the registers are described later.

For example, from the television receiver 200, information of a structure (3D structure) and a video format of stereoscopic image data which can be managed in the television receiver 200 is supplied to the mobile phone 100. Here, the 3D structure indicates a transmission format of the stereoscopic image data (3D image data) such as a frame packing format, a side by side format and a top-and-bottom format, for example. Moreover, the video format indicates resolution, frame number (field number) or the like of the 3D image data such as 1920x1080i@60 Hz or 1280x720P@60 Hz.

In addition, for example, from the television receiver 200, information of the stereoscopic image display system (3D display system) is supplied to the mobile phone 100. Here, there are, for example, 3D glasses (3D Glass) systems (shutter glass system), a direct viewing system, a head mounting system or the like as the 3D display system. Moreover, for example, location information of an observer (viewer) of a 3D image is supplied to the mobile phone 100 from the television receiver 200. In addition, for example, reversely, the location information of the observer (viewer) of the stereoscopic image (3D image) is supplied to the television receiver 200 from the mobile phone 100. Here, the location information is information such as a distance, an angle (vertical angle, traverse angle and torsion angle) which show a face location of the observer with respect to an image display unit, for example.

In addition, for example, there is a case where the 3D display system of the television receiver 200 is the direct viewing system and a lenticular lens is arranged on the display screen. In this case, either information of the shifted amount and a rotational angle of the lenticular lens in the vertical and traverse directions and information of the shifted amount or an rotational angle of an image in the vertical and traverse directions, or both are supplied to the television receiver 200 from the mobile phone 100. Moreover, for example, information of a display location (a width, a height and a depth) of subtitles of closed caption or the like is supplied to the mobile phone 100 from the television receiver 200.

Moreover, for example, in a case where the 3D display system of the television receiver 200 is the 3D glass system (shutter glass system), ON and OFF information of 3D is supplied to the mobile phone 100 from the television receiver 200. In addition, in this case, the ON and OFF information of 3D is supplied to the television receiver 200 from the mobile phone 100. Additionally, for example, in a case where the 3D display system of the television receiver 200 is the 3D glass system (shutter glass system), power ON and OFF information of the shutter glasses is supplied to the television receiver 200 from the mobile phone 100. Furthermore, for example, information of the 3D structure and the video format of the 3D image data transmitted are supplied to the television receiver 200 from the mobile phone 100.

[Configuration Example of Mobile Phone and Television Receiver]

Figure 2:
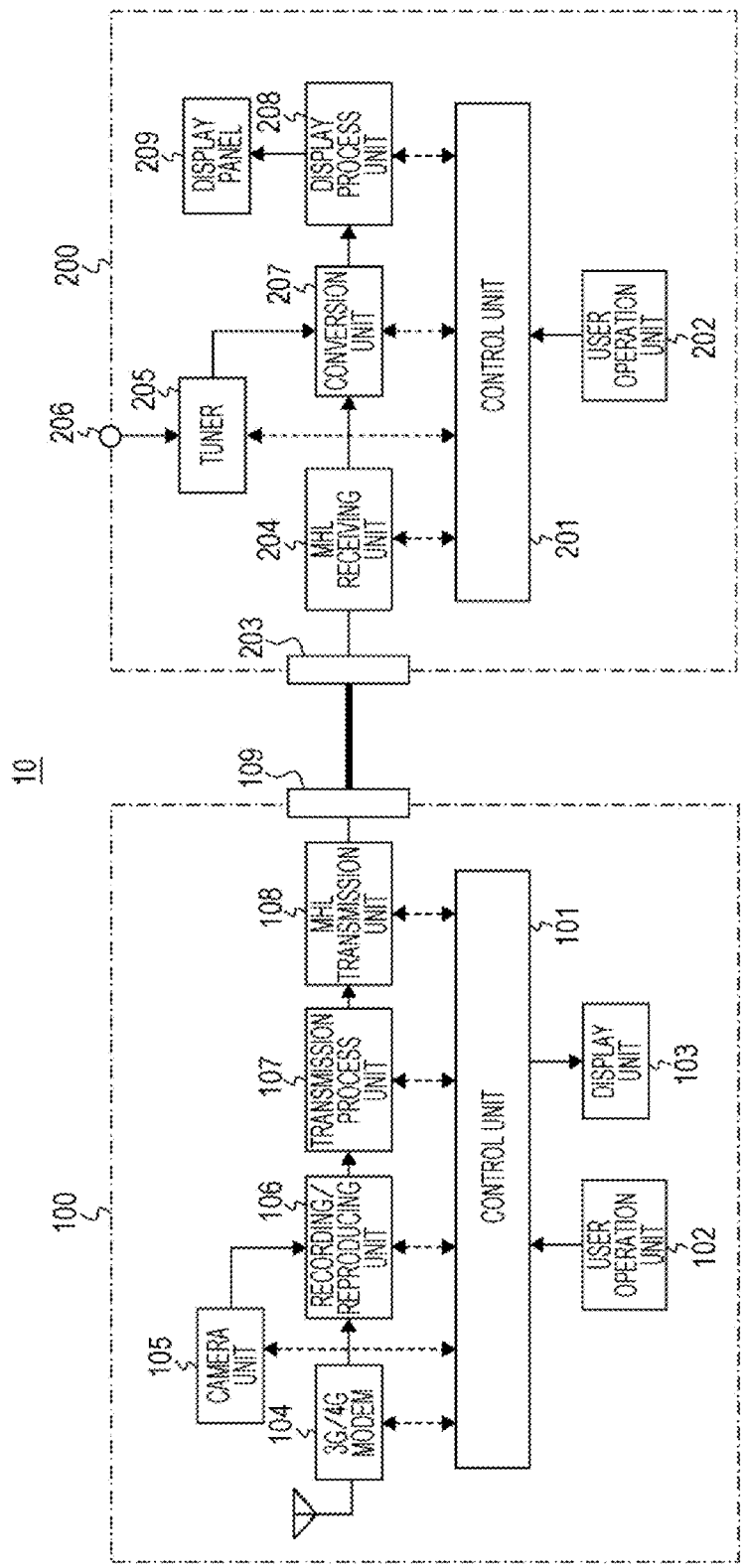
FIG. 2 is a block diagram of a configuration example of a mobile phone and a television receiver which constitutes the image display system.

FIG. 2 illustrates a configuration example of the mobile phone 100 and the television receiver 200. First, the mobile phone 100 is described. The mobile phone 100 includes a control unit 101, an user operation unit 102, a display unit 103, and a 3G/4G modem unit 104, a camera unit 105, a recording reproduction unit 106, a transmission process unit 107, an MHL transmission unit 108 and an MHL terminal 109.

The control unit 101 controls operations of each unit of the mobile phone 100. The user operation unit 102 and the display unit 103 constitute a user interface and are connected to the control unit 101. The user operation unit 102 is configured of keys, buttons, dials disposed on a case, not shown, of the mobile phone 100 or touch panel disposed on a display surface of the display unit 103 or the like. The display unit 103 is configured of an LCD (Liquid Crystal Display), an organic EL (Electro Luminescence) or the like.

The 3G/4G modem 104 performs communication of a cellular phone. The camera unit 105 takes moving images and still images. The recording reproduction unit 106 is driven in recording media such as a built-in memory (non volatile memory) or a memory card, for example, and performs recording reproduction (writing and reading). The recording reproduction unit 106 performs the recording reproduction of the communication operated through the modem unit 104. Moreover, the recording reproduction unit 106 performs recording reproduction of image data such as moving images or still images and voice data obtained through the modem unit 104 and recording reproduction of image data such as moving images or still images and voice data obtained by being imaged by the camera unit (including a microphone) 105. In addition, in the recording reproduction unit 106, a codec process for compressing the data with respect to the image data such as the moving images or the still images obtained by being imaged by the camera unit 105 is carried out.

According to instruction of the user through the user operation unit 102, recording contents of the recording media of the recording reproduction unit 106 can be displayed as content lists. In addition, as arbitrary one among the content lists is instructed by the user through the user operation unit 102, in the recording reproduction unit 106, data of the instructed contents is reproduced from the recording media and transmitted to the transmission process unit 107.

Here, a case where the image data and the voice data obtained by the 3G/4G modem 104 or the image data and the voice data obtained by the camera unit 105 are transmit through real time may be also considered. In this case, the contents data is not shown, however, the data is directly transmitted to the transmission process unit 107. Moreover, a case may be also considered where after inserting the memory card to other devices and writing the contents data, the memory card is installed in the recording reproduction unit 106 and the data is transmitted to the transmission process unit 107.

The transmission process unit 107 performs a process to make the data such as the moving images, the still images and the voice data which is reproduced by the recording reproduction unit 106 and is transmitted to the television receiver 200 be an appropriate form. For example, a transmission format and a video format of the 3D image data are converted so as to be possible to be managed in the television receiver 200. The MHL transmission unit 108 is connected to the MHL terminal 109. The MHL transmission unit 108 transmits the data such as the images and the voices processed by the transmission process unit 107 from the MHL terminal 109 through the MHL cable 300 to the television receiver 200 in one direction according to the communication on the basis of MHL standards. The details of the MHL transmission unit 108 are described later.

Next, the television receiver 200 is described. The television receiver 200 includes a control unit 201, an user operation unit 202, an MHL terminal 203, an MHL receiving unit 204, a tuner 205, an antenna terminal 206, a conversion unit 207, a display process unit 208 and a display panel 209. The control unit 201 controls operations of each unit of the television receiver 200. The user operation unit 202 constitutes an user interface and is connected to the control unit 201. The user operation unit 202 is configured of keys, buttons, dials disposed on a case, not shown, of the television receiver 200 or a remote controller.

The MHL receiving unit 204 is connected to the MHL terminal 203. The MHL receiving unit 204 receives the data of the images and the voices which are transmitted from the MHL transmission unit 108 in one direction of the mobile phone 100 connected through the MHL cable 300 according to the communication on the basis of the MHL standards. The MHL receiving unit 204 supplies the received image data to the conversion unit 207. In addition, the voice data received by the MHL receiving unit 204 is supplied to the conversion unit for the voice data, not shown. The details of the MHL receiving unit 204 are described later.

The tuner 205 receives BS broadcasting, digital terrestrial broadcasting or the like. A broadcasting signal caught by an antenna, not shown, connected to the antenna terminal 206 is supplied to the tuner 205. The tuner 205 acquires image data (screen image signal) and voice data of a predetermined program on the basis of the broadcasting signal. The conversion unit 207 selectively extracts the image data received by the MHL receiving unit 204 or the image data acquired by the tuner 205.

The display process unit 208 performs an overlapping process of subtitles such as the closed caption with respect to the image data extracted by the conversion unit 207. In addition, in a case where the image data extracted by the conversion unit 207 is the 3D image data, the display process unit 208 performs a creation process of image data according to the 3D display system of the television receiver 200 on the basis of the image display thereof. The display panel 209 displays images according to the image data processed by the display process unit 208. For example, the display panel 209 is configured of an LCD (Liquid Crystal Display), an organic EL (Electro Luminescence), a PDP (Plasma Display Panel) or the like.

[Configuration Example of MHL Transmission Unit and MHL Receiving Unit]

Figure 3:
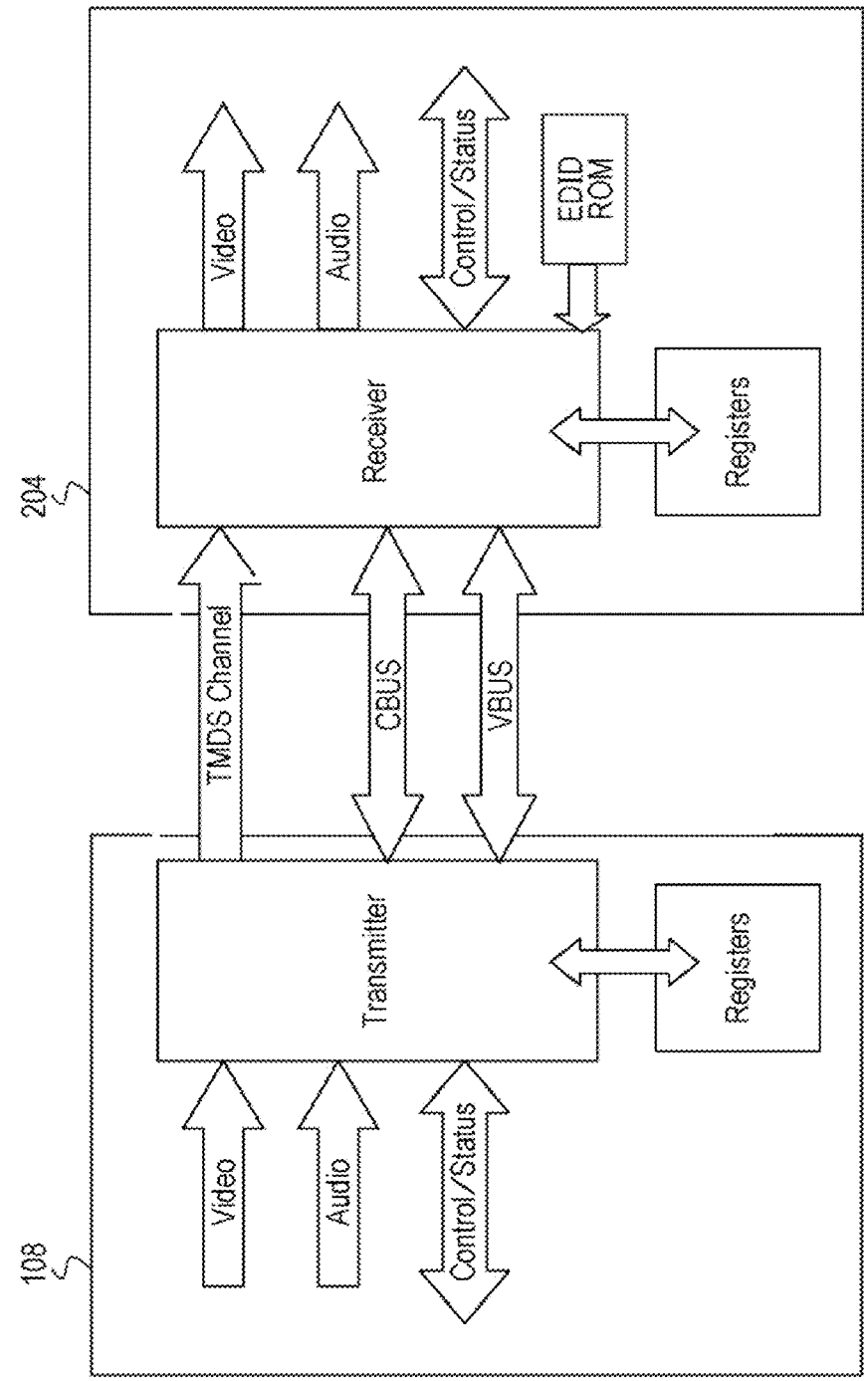
FIG. 3 is a diagram of a configuration example of an MHL transmission unit of a mobile phone, an MHL source device, and an MHL receiving unit of a television receiver, an MHL sink device.

FIG. 3 illustrates a configuration example of the MHL transmission unit 108 of the mobile phone 100 and the MHL receiving unit 204 of the television receiver 200 in FIG. 2. The MHL transmission unit 108 is provided with a transmitter (Transmitter) and the MHL receiving unit 204 is provided with a receiver (Receiver). The MHL transmission unit 108 and the MHL receiving unit 204 are connected to each other through a pin and the MHL cable using five lines (MHL+, MHL−, CBUS, VBUS and GND). The pin assignment varies according to connectors, description regarding the above is not mentioned here. The "MHL+" and "MHL−" are a pair of twisted pair and transmit the AV stream and synchronized signal thereof (MHL clock).

The CBUS is used for transmitting a DDC command and an MSC command in mutual directions. The DDC command is used for the EDID reading or the HDCP authentication. In addition, the MSC command is used for control of the EDID reading, the reading and writing of various registers, control of the remote controller or the like. The VBUS is used to supply a power source of +5V from the MHL sink device to the MHL source device or from the MHL source device to the MHL sink device.

FIG. 4 illustrates a configuration of a register used for MHL. The MHL transmission unit 108 and the MHL receiving unit 204 respectively have four kinds of registers and the registers can be mutually accessed by the MSC command. The respective roles are as below.

(1) Capability Register (Capability Registers)

There are registers which indicate functions of each MHL device. By reading "MSC READ_DEVCAP command", it is possible to obtain function information of the other party side device.

(2) Interrupt Register (Interrupt Registers)

The interrupt register is used for events notification of the other party side MHL device. Through "MSC SET_INT command", the register is set to the interrupt register of the other party side.

(3) Status Register (Status Registers)

The status register notifies the other party side MHL device of the fact that the capability register thereof can be read and a state of TMDS channel (TMDS channel). Through "MSC WRITE_STAT command", the register is written to the status register of the other party side.

(4) Scratchpad Register (Scratchpad Registers)

The scratchpad register performs transmission of messages or data to the other party side MHL device. Through "MSC WRITE_BURST command", the register is written to the scratchpad register of the other party side.

In addition, in FIG. 4, "MSC Offset Range", "Max. Size", "Req'd Size" and "Usage MHL CBUS" are respectively indicate the followings. In other words, "MSC Offset Range" indicates an offset value during reading and writing with respect to each register of the other party side MHL device. "Max. Size" indicates the maximum capacity (bytes) of each register. "Req'd Size" indicates the minimum register capacity (bytes) in which each of the MHL devices needs to have.

"Usage MHL CBUS" indicates the MSC command which uses an access system (reading, writing and set bits) with respect to each of the registers of the other party side MHL device. For example, in the capability register (Capability Registers) of the other party side MHL device, only reading is available and "READ_DEVCAP command" may be used at this time. Additionally, the set bits (Set Bits) indicates that a certain bit (a plurality of bits can be used) of the interrupt register (Interrupt Registers) of the other party side MHL device is set and "SET_INT command" is used at this time. By utilizing the registers, various applications regarding 3D is described.

[Description of 3 Application]

Various applications regarding the 3D of the image display system 10 in FIG. 1 and FIG. 2 is described. Hereinafter, the description is made by appropriately setting the mobile phone 100 as the MHL source device and the television receiver 200 as the MHL sink device.

[Transmission of 3D Capability]

Prior to the transmission of the 3D, the source device needs to know 3D capability of the sink device and to transmit 3D image data of a range which can be supported by the sink device. Specifically, it means that a 3D structure supported by the sink device and a video format supported by each of the 3D structures. The 3D structures are a frame packing format, a side by side format, a top-and-bottom format or the like. Moreover, the video formats are 1920x1080i, 60 Hz, 1280x720p, 60 Hz or the like.

In HDMI, the information is defined in HDMI-LLC Vendor-Specific Block (VSDB) in EDID and is written by the HDMI source device in addition to other EDID information. The 3D information itself in VSDB is the data amount of about several bytes to ten-odd bytes. The data length of EDID is 2 blocks (256 bytes) as the minimum and 256 blocks (32,768 bytes) as the maximum. Between the above, HDMI VSDB is included in a general block 1 (second block from the head).

Figure 5:
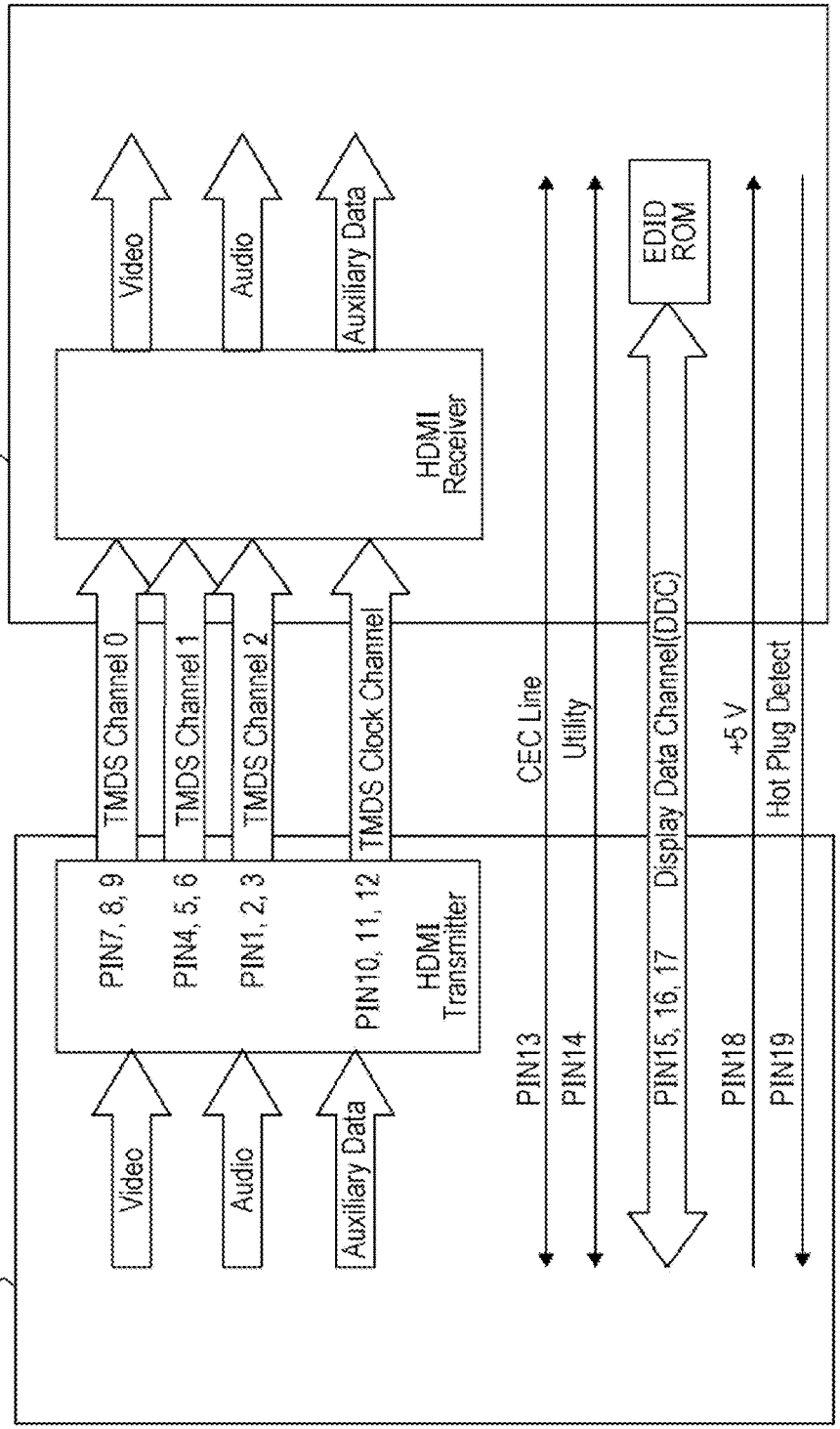
FIG. 5 is a diagram of a configuration example of an HDMI transmission unit of an HDMI source device and an HDMI receiving unit of an HDMI sink device.
Figure 6:
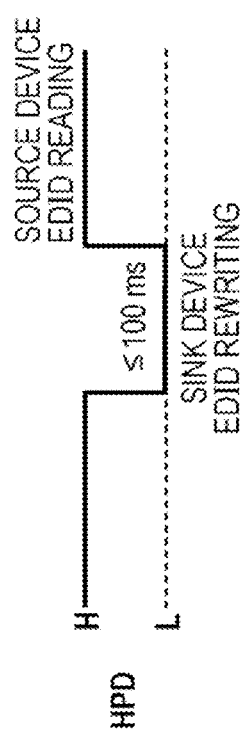
FIG. 6 is a diagram which illustrates immediately after the HDMI sink device is connected to the HDMI source device, an HPD line (PIN 19) is set to low (L) by 100 ms or more.

FIG. 5 illustrates a configuration example of an HDMI transmission unit of an HDMI source device and an HDMI receiving unit of an HDMI sink device. After connection with the HDMI source device, the HDMI sink device allows an HPD line (PIN 19) to be lowered (L: Low) by 100 ms or more as shown in FIG. 6. The HDMI source device makes the above as a trigger and reads EDID from an EDID ROM in FIG. 5 using the DDC line (PINs 15, 16 and 17) on the basis of I2C Bus standards. Moreover, during a period in which the HPD line is high (H: High), the HDMI source device always can read EDID. Reversely, in addition, a period in which the HPD line is low, the EDID reading is prohibited.

Moreover, in a case where during the connection of the HDMI source device and the HDMI source device, a change is generated in the contents of EDID including the 3D information, the HDMI sink device allows the HPD line to be low and after the change of EDID is performed, allows the HPD line to be high again. The HDMI source device made the above as a trigger and read EDID again. If where a change is generated in 3D information supported by the HDMI sink device side, the change of EDID is performed according to the procedure described above and it is necessary to allow the HDMI source device to read. As the case where the change is generated in the 3D information supported by the HDMI sink device side, for example, there are cases where the user changes activation/inactivation of 3D receiving, 3D structure or a video format support range through 3D support menu of a television.

In MHL, the MHL sink device has EDID in the same manner as HDMI, however does not have the HPD line. Therefore, a process corresponding to the low HPD line of HDMI is simulated using the MSC command. At this time, a time corresponding to the low HPD line is defined to be 50 ms or more.

FIG. 7 is a timing chart illustrating flow at this time. After the connection of the MHL sink device and the MHL source device, as shown in FIG. 7, the MHL sink device transmits "CLR HPD command" to the MHL source device and the MHL source device sends back "ACK command" which indicates that the command is received. By having a gap of 50 ms as the minimum, "SET_HPD command" is transmitted from the MHL sink device, "ACK command" with respect to the above is received and the process is finished.

During a period from receiving "CLR_HPD command" to receiving "SET_HPD command", the EDID reading of the MHL source device is prohibited and during the other periods than the above, the MHL source device is always capable of reading. The EDID reading is performed using the DDC command on a BUS line shown in FIG. 3. Subsequently, in a case where a change is generated in the EDID contents of the MHL sink device side, the procedure shown in FIG. 7 is executed again and EDID is changed during a prohibition period of the EDID reading.

When the 3D information is defined in EDID inside portion in the same manner as HDMI in MHL, a time lag of 50 ms or more occurs. Moreover, when the 3D information is defined in the EDID inside portion in the same manner as HDMI in MHL, only ten-odd bytes are changed, however it is necessary to read the data of 256 bytes as the minimum and 32,768 bytes as the maximum and furthermore, it takes excessive time and unnecessary power consumption is necessary. That is, the above is disadvantageous for a case where process performance of a CPU such as the mobile phone is low and of being driven using batteries. In the present invention, it is possible to solve the disadvantages described above by utilizing the registers described above which is installed to the MHL source device as standards and the MHL sink device and transmitting information which is required at the minimum. Hereinafter, a method using the capability register (Capability Register) and a method using scratchpad register (Scratchpad Register) are described.

(Method Using Capability Register (Capability Registers))

First, a method using the capability register is described. Each of the MHL devices writes at the terminal stage own capabilities in the capability register in advance. The MHL devices (MHL source devices and MHL sink devices) can know the capability thereof by reading the capability register of the other party side using "READ_DEVCAP command".

FIG. 8 illustrates a state of parameter allocation of the current capability register (Capability Registers). A parameter in which "X" is attached of a right side in FIG. 8 shows that the MHL sink device, the MHL source device and an MHL dongle device support the parameter thereof.

Figure 9:
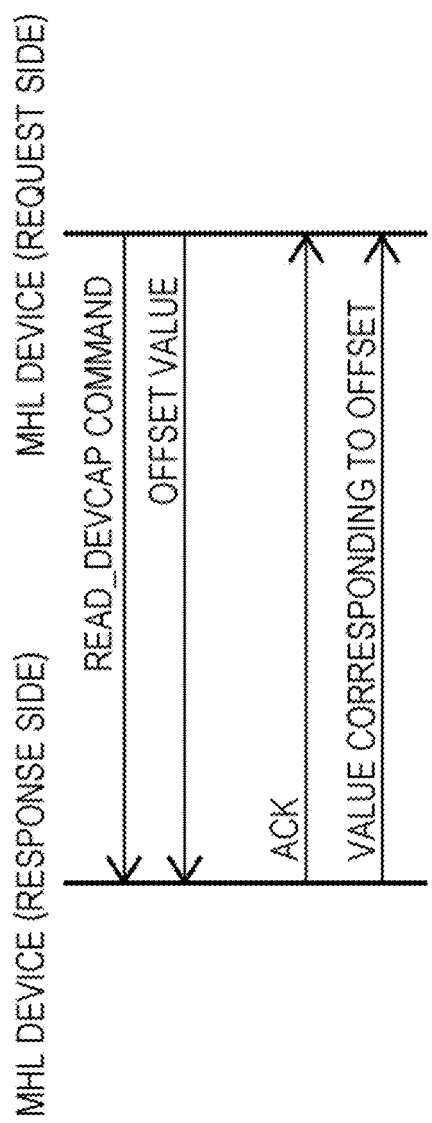
FIG. 9 is a diagram of a procedure in which the MHL device (request side) reads the capability register (Capability Registers) of the MHL device (response side).

FIG. 9 illustrates a procedure that the right side MHL device (request side) reads the capability register (Capability Registers) of the left side MHL device (response side). The right side MHL device transmits "DEAD_DEVCAP command" and the OFFSET value (address) of the read information to the left side MHL device. With respect to the above, the left side MHL device transmits ACK showing that the command is received and a value corresponding to the designated OFFSET value to the right side MHL device.

Moreover, a case where the capability register of itself is changed in the middle of the process, the MHL device which performs the change, can notify the effect by turning ON the corresponding bits of the interrupt register (Device Interrupt Registers) of the other party side. FIG. 10 illustrates a structure of the interrupt register. In addition, FIG. 11 illustrates details of "RCHANGE_INT Register" of "address 0x20".

Figure 12:
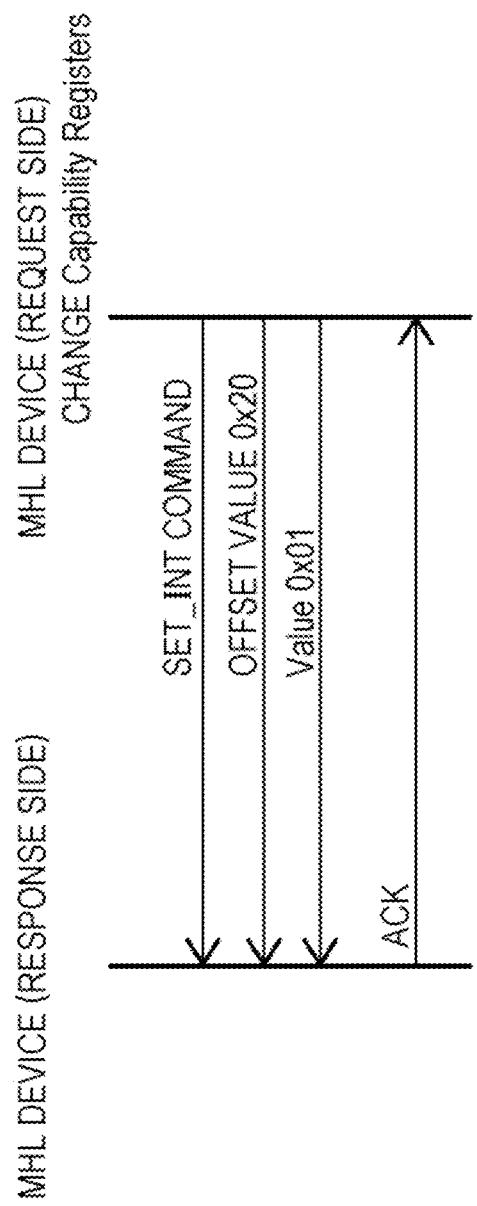
FIG. 12 is a diagram of a procedure which after the MHL device (change side) changes at the terminal stage own capability register (Capability Registers), notifies the changes thereof to the MHL device (response side) of the other party.

FIG. 12 illustrates a procedure which, after the right side MHL device (change side) changes at the terminal stage own the capability register (Capability Registers), notifies the effect to the MHL device of the other party side (response side). First, the right side MHL device changes any part of at the terminal stage own the capability register. Next, the right side MHL device transmits "SET_INT command", "OFFSET 0x20" and "Value 0x01" following the left side MHL device. The above means that "1" is set to DCAP_CHANGE (Bite 0) of RCHANGE_INT (offset 0x20) shown in FIG. 11.

The left side MHL device sends back ACK showing that the command is normally received to the right side MHL device. In addition, the left side MHL device can know that there is a change in capability register (Capability Registers) of the other party side by setting the DCAP_CHG bits of itself to "1" and by repeating the procedure shown in FIG. 9, the re-read is performed.

Here, in a case of the MHL sink device which supports 3D, the supported 3D structure and the video format are written to offset value not used yet, for example, 0x0F to 0x1F shown in FIG. 8. It is possible to know a 3D support state of the MHL sink device by reading the MHL source device of the procedure shown in FIG. 9. FIG. 13 is an example in which the parameters regarding 3D are defined, however, other definition can be applied.

Each of parameters regarding 3D in FIG. 13 is described. In a case of "3D_present=1", the MHL sink device supports 3D. Formats in which a mandatory format and an optional format designated from the address 0x10 are supported for 3D. In a case of "3D_present=0", 3D is not supported.

The mandatory format is shown in FIG. 14, for example. In FIG. 14, VIC (Video ID Code) means video numbers added to the video format defined by CEA-861. In the VIC, the video format supported in the MHL sink device as 2D is designated using VIC numbers in "Short Video Descriptor" in "Video Data Block" of EDID.

"MHL_3d_LEN" is effect in a case of "3D_persent=1". The "MHL_3d_LEN" shows an effective parameter length from the address 0x10. Three parameters, that is, "2D_VIC_order_n", "3D_Structure_n" and "3D_Detail_n" define one of optional 3D video format information by grouping the above three into one set. n indicates numbers from 0 to 15.

"2D_VIC_order_n" designates the video format capable of 3D transmitting with index from 0 to 15. This index indicates specific one of VIC row from the head to 16th designated for "Short Video Descriptor" 2D in "Video Data Block" in EDID. For example, in a case of "2D_VIC_order_n=0", the index indicates a first VIC (head) and in a case of "2D_VIC_order_n=15", the index indicates a 16th VIC.

"3D_Structure_n" shows the video format designated by "2D_VIC_order_n" by the 3D structure capable of transmitting as 3D with several values from 0 to 3. The respective values indicate the following meanings.

0: Frame Packing
1: Side-by-Side
2: Top-and-Bottom
3: (Reserved)

"3D_Detail" is effective only in a case of "3D_Structure_n=1 (Side-by Side)" and becomes any one of values from 0 to 3. The respective values indicate the following meanings.

0: Traverse sub-sampling odd position
1: Traverse sub-sampling even position
2: Quincunx matrix sub-sampling odd position
3: Quincunx matrix sub-sampling even position Here, a specification in which sixteen optional 3D video formats are made to be capable of being designated at the maximum is set, in general, if areas of this degree is secured, there is no problem. However, if the change the specification, it is possible to designate more 3D video formats. In addition, as a flag which notifies the change in the 3D information, 3D_CHG flag is added to Bit 4 in FIG. 11.

Using the added parameters described above, in the next procedure, the MHL source device is allowed to read the 3D information of the MHL sink device. In other words, (1) immediately after the connection of the MHL sink device and the MHL source device, or immediately after the 3D information is changed in FIG. 13 and FIG. 14, the MHL sink device is performed as below. That is, the MHL sink device transmits "SET_INT command (SET_INT+OFFSET 0x20+Value 0x10)" and sets 3D_CHG flag of the MHL source device side to be "1". (2) The MHL source device response ACK. (3) The MHL source device recognizes that 1 is set to 3D_CHG flag and by repeating the procedure shown in FIG. 9, the 3D information is read. A sequence drawing in FIG. 15 shows the procedure at this time.

(Method for Utilizing Scratchpad Register (Scratchpad Registers))

Next, a method for using the scratchpad register is described. Each of the MHL devices has the scratchpad registers of 16 bytes length to 64 bytes length used for transmitting messages or data to the MHL device of the other party side (refer to FIG. 4). In the present invention, the scratchpad register is utilized to transmit the 3D information to the MHL source device from the MHL sink device.

Figure 16:
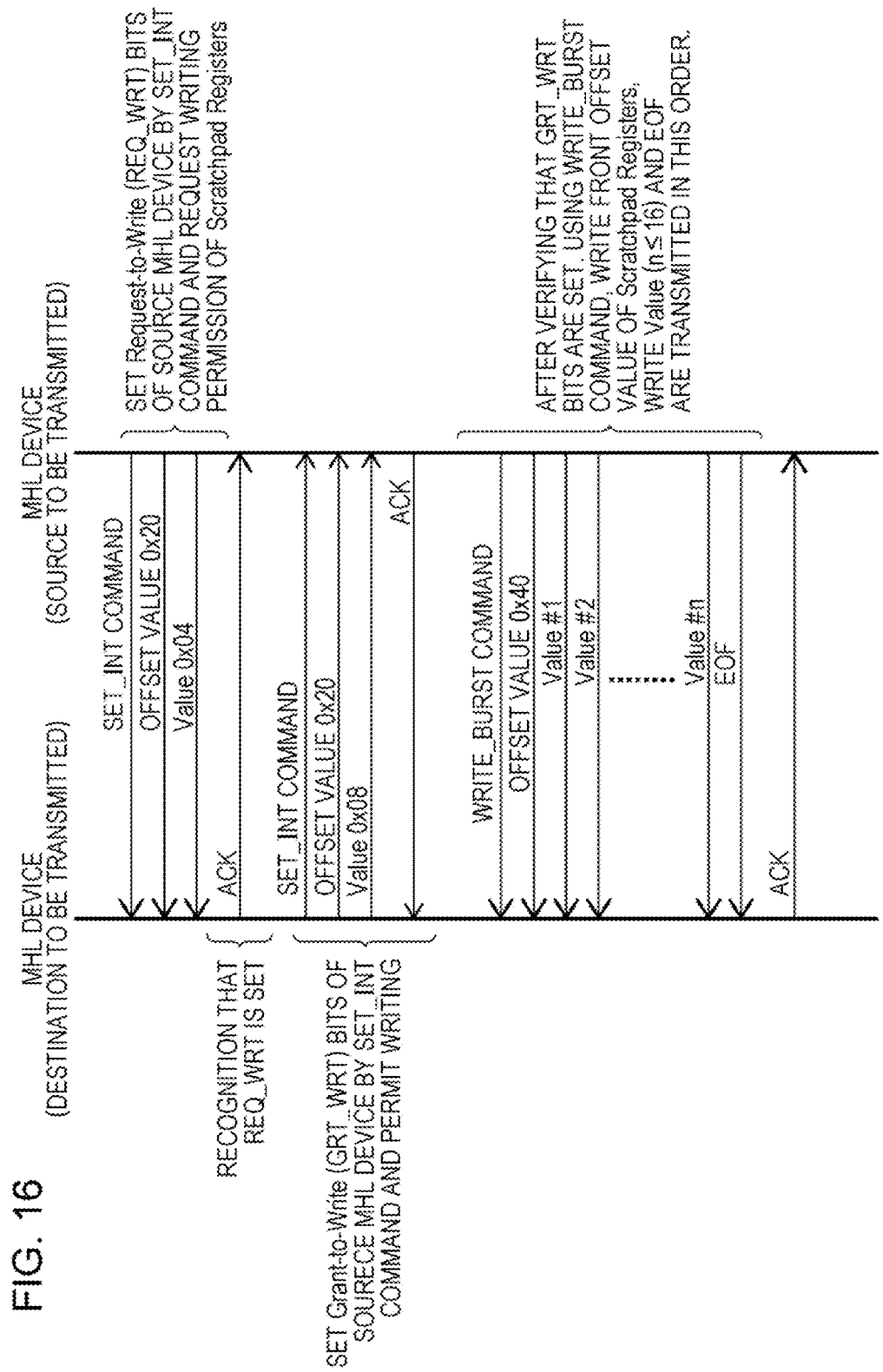
FIG. 16 is a sequence diagram of a transmission method using general scratchpad register (Scratchpad Registers).

FIG. 16 shows a transmission method using general scratchpad register (Scratchpad Registers). Basic procedures of the transmission method are (1) to (3) below.

(1) Request write permission to the MHL device of destination to be transmitted (setting REQ_WRT bits of a destination to be transmitted with a SET_INT command).

(2) The MHL device of the destination to be transmitted permits writing (setting GRT_WRT bits of a transmission source with the SET_INT command).

(3) The MHL device of the transmission source transmits the writing data (WRITE_BURST command+writing head offset+data of 16 bytes at the maximum+EOF).

FIG. 17 illustrates 3D information which is transmitted from the MHL sink device to the MHL source device through the transmission method using the scratchpad register (Scratchpad Registers) described above. In the head first byte, an identifier "3D_ID_CODE (3D Capability)" which shows that the data transmitted from the first byte is 3D information is arranged. The parameters after second bytes have the same meaning as that in FIG. 13. In a case where the data length exceeds 16 bytes so that the data may not be transmitted with the "WRITE_BURST command" at a time, the remaining data is transmitted by repeating the procedure shown in FIG. 16.

[Cooperation Between Devices of 3D]

In addition to the 3D information described above, the information shown as below is transmitted between the MHL sink device and the source device through the scratchpad register (Scratchpad Registers). By doing so, cooperation between the devices of 3D is performed and meticulous control is performed.

(1) ON/OFF of 3D: sink→source and source→sink (2) 3D display system of sink side (3D glasses, head mounting and direct viewing): sink→source (3) Location of observer (distance, vertical angle θ1, traverse angle θ2 and torsion angel θ3): sink→source and source→sink (4) Lenticular lens or vertical shifted amount, traverse shifted amount and rotational angle θ of an image: source→sink (5) Display location of subtitles such as closed caption (CC) or the like: sink→source

[ON/OFF Control Function of 3D]

Through the present application, the MHL sink device which has the 3D display function can allow the MHL source device of the transmission source to perform requests, during the receiving of 3D contents from the MHL source device, to temporarily convert the display into 2D in the middle of the receiving or convert the display into 3D. For example, it is effective when the observer (viewer) takes off the 3D glasses, when the power of the 3D glasses is turned off, or the like.

When the MHL sink device detects that the 3D glasses are taken off, the power of the 3D glasses is turned off, a 3D/2D button on the remote controller is pressed, or the like, the MHL sink device requests 2D to the MHL source device. At this time, the MHL sink device requests 2D to the MHL source device by transmitting, for example, 2 bytes information (data row) shown in FIG. 18. The MHL sink device (transmission source) transmits the 2 bytes information to the MHL source device by writing the information to the scratchpad register (Scratchpad Registers) of the MHL source device (destination to be transmitted) following the procedure shown in FIG. 16.

In the 2 bytes information shown in FIG. 18, in the first byte, the identifier "3D_ID_CODE (3D ON/OFF)" which shows that the information is 3D ON/OFF information is disposed. In addition, in the 2 byte information, 3D ON/OFF information "3D_ON/OFF" is disposed in a seventh bit of the second byte. Here, "3D_ON/OFF=0" is set, "3D OFF", that is, "request for 2D" is displayed. In addition, by setting "3D_ON/OFF=1", "3D ON", that is, "request for 3D" may be displayed.

The MHL source device which receives the 2 bytes information is converted into 2D from 3D after the transmission contents. Reversely, when the transmission contents returns to 3D, the MHL sink device transmits the 2 bytes information shown in FIG. 18 is transmitted again. In this case, "3D_ON/OFF=1" is set and "3D ON", that is, "request for 3D" is displayed. The MHL source device which receives 2 bytes information converts from 2D into 3D after the transmission contents.

By ON/OFF control of 3D described above, when the observer takes off the 3D glasses, the power of the 3D glasses is turned off or the like, immediately the display is converted into 2D. Therefore, the observer can continuously watch the contents of 2D without seam. In addition, by the ON/OFF control of 3D described above, when the observer wears the 3D glasses, the power of the 3D glasses is turned on or the like, the display is immediately converted into 3D. Therefore, the observer can continuously watch the contents of 3D without seam.

In the above described, the MHL sink device controls 3D/2D of the contents transmission of the MHL source device. Reversely, a case where the MHL source device controls the 3D/2D display of the MHL sink device can be considered. In this case, the 2 byte information (data row) shown in FIG. 18 described above is transmitted to the MHL sink device from the MHL source device following the procedure shown in FIG. 16. In a case where 2D contents may be inserted into 3D contents, by performing the present process at the timing of conversion from 3D into 2D, it is possible to allow the right and left glasses to enter an opening state, for example, by inactivating the shutter of the 3D glasses. By doing so, 2D images can be more clearly viewed compared to when the shutter is activated.

In HDMI, during perpendicular blanking, by HDMI VSI (Vendor Specific InfoFrame) packet, the 3D contents information during the transmission is transmitted to the HDMI sink device. Therefore, in also MHL in the same manner, by utilizing the perpendicular blanking period, that the 3D/2D conversion information is transmitted to the MHL sink device can be considered. However, in a case of a video format of a frame rate of 60 Hz, if the perpendicular blanking is used, a time lag of 16.7 ms at the maximum occurs. On the other hand, when the information is exchanged by the scratchpad register (Scratchpad Registers), since a transmission rate is performed via the CBUS of about 1 Mbps, it is more advantageous than the case of using the perpendicular blanking.

[Function of Detecting the Location of the Observer and Displaying Appropriate 3D Images: a Case of 3D Glass System]

The present application is an application for the 3D glass system (shutter glass system). Therefore, prior to the process, the MHL sink device notifies the MHL source device of that the 3D display system is the 3D glass system.

Therefore, the MHL sink device notifies the MHL source device by transmitting the 2 byte information (data row) shown in FIG. 19, for example. The MHL sink device (transmission source) transmits the 2 byte information by writing the information to the scratchpad register (Scratchpad Registers) of the MHL source device (destination to be transmitted) following the procedure shown in FIG. 16.

In the 2 byte information shown in FIG. 19, in the first byte, an identifier "3D_ID_CODE (Sink Class)" which shows that the information is the 3D display system information is disposed. In addition, in a seventh bit to fifth bit of the second bytes in 2 byte information, 3D display system information "Sink Class" is disposed. Here, "Sink Class=001" is set, "3D glass system" is displayed. In addition the above, for example, "Sink Class=010" shows "direct-viewing" and "Sink Class=011" shows "head mounting system".

The MHL source device functions the present application in a case of 3D glass system. In a case of the MHL sink device of the 3D glass system, in general, when the observer (viewer) perpendicularly watches 3D images in a front direction, maximum 3D effect can be obtained. When the observer watches the 3D images in a tilt direction from the television or in a state where the face is shifted, not only the 3D effect is lowered but also the observer may feel physiologic inconvenience.

Here, in the present application, a correction process is carried out in order to allow the 3D images to enter in an optimized state with respect to the location where the observer watches the images. In this case, for example, as shown in FIG. 20(a), using a location detection sensor (face detection sensor) installed in the MHL sink device, the location or the gradient of the face of the observer from the television screen is detected.

Figure 20:
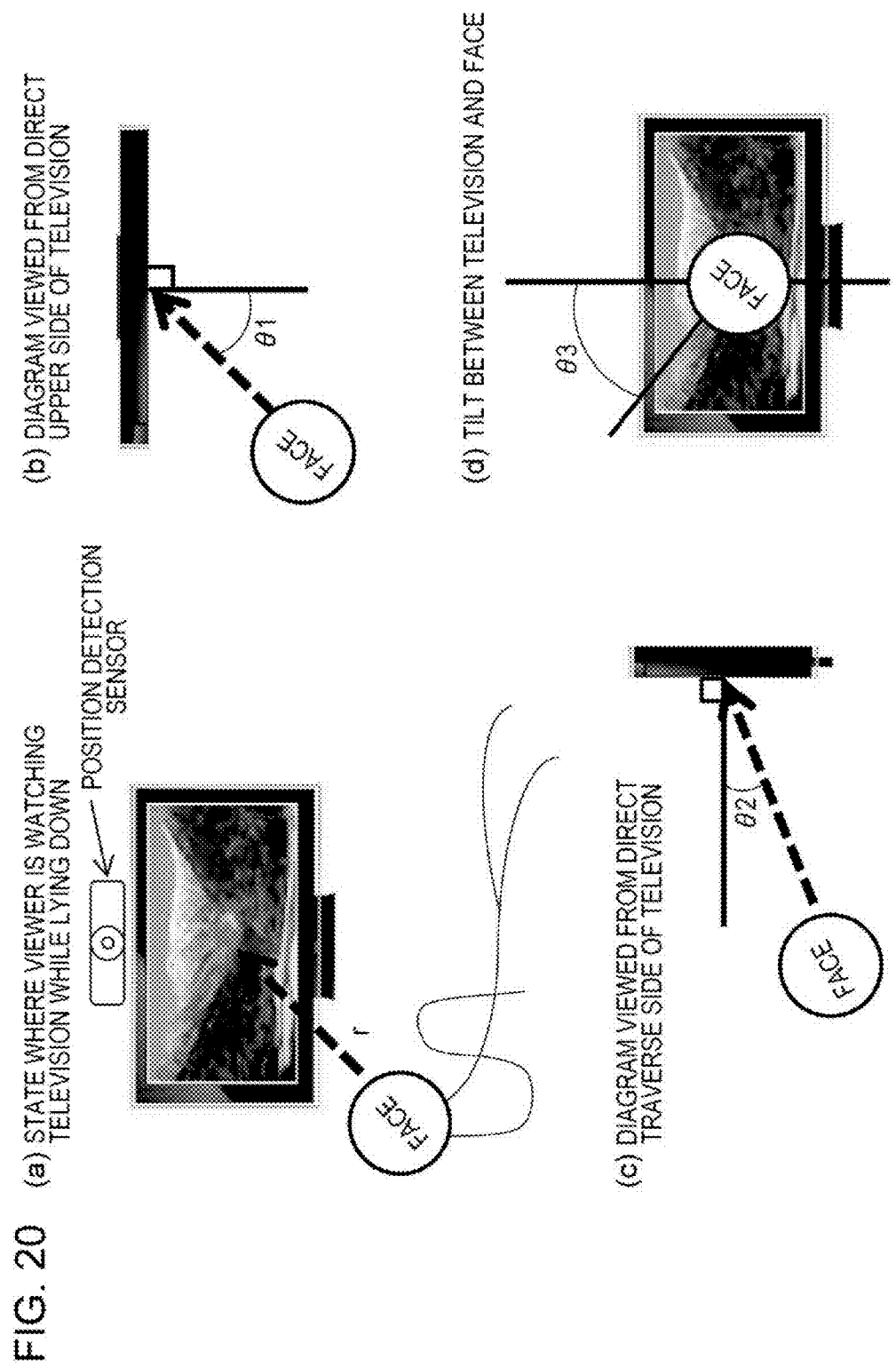
FIG. 20 is a diagram for explaining information such as a distance or an angle with respect to a television of a face location of an observer.

As shown in FIG. 20, a case where there is one observer can be considered. In this case, a distance from a center of the television screen to the face of the observer is set to r (refer to FIG. 20(a)), an angle in the traverse direction with respect to a normal line which passes to the center of the television screen is set to an angle θ1 (refer to FIG. 20(b)). Moreover, in this case, an angle in the vertical direction with respect to a normal line which passes to the center of the television screen is set to an angle θ2 (refer to FIG. 20(c)) and an angle of the gradient of the face is set to an angle θ3 (refer to FIG. 20(d)).

Figure 21:
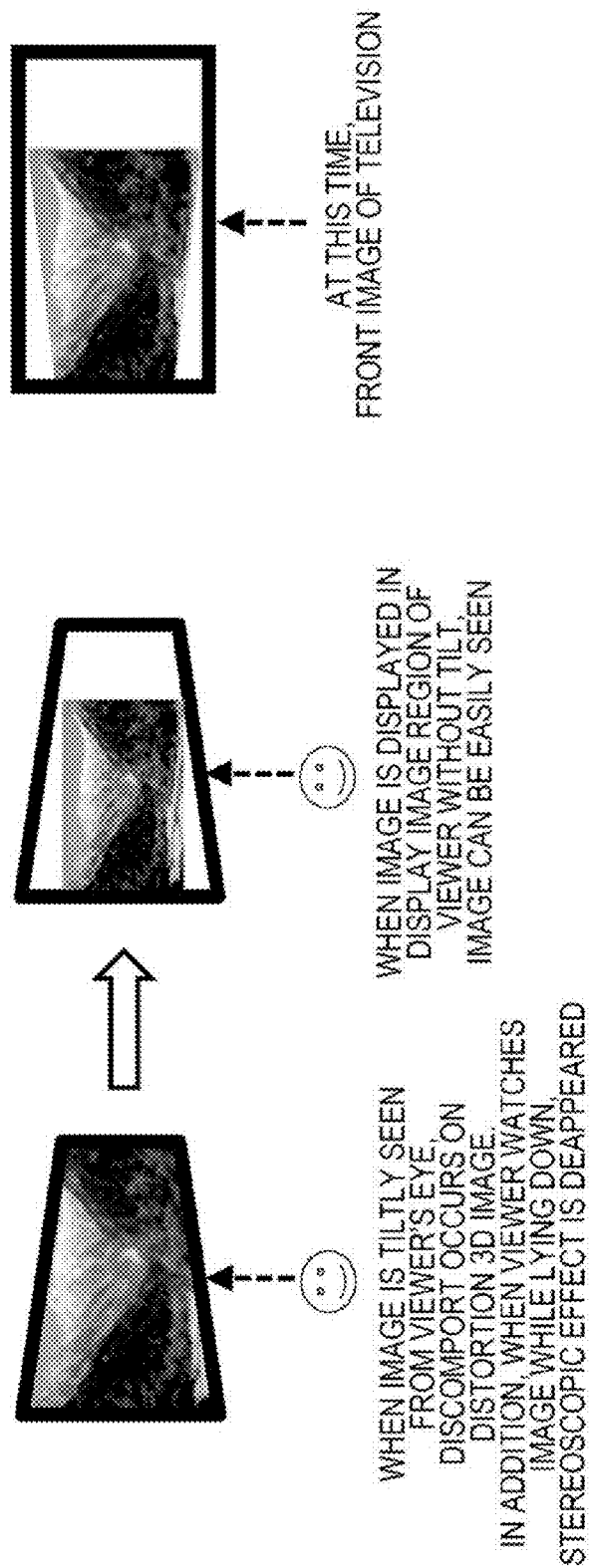
FIG. 21 is a diagram of an example of performing correction in order that the observer may easily watch a 3D image on the basis of the face location of the observer.

FIG. 21 illustrates an example of correction to make the 3D images be easily viewed with respect to the observer. As shown in FIG. 21, the images are displayed so as to be viewed from the front of the screen in order to maximize the 3D effect with respect to the observer. In addition, the drawings are omitted, however, a case where there are two observers or more, a method for performing the correction by focusing on the average location or one observer who is close to the screen is considered.

As shown in FIG. 22(a), when it is difficult to detect the face location of the observer using the location detection sensor (face detection sensor), for example, as shown in FIG. 22(b), a method for performing the correction through a manual operation while watching the screen using an arrow button and rotational button of a remote controller is considered. Regarding the 3D image correction technique and the face detection technique using the sensor as can be seen from the above, the well-known techniques in the related art can be used and therefore, here, the detailed description is omitted.

When the input of the location information is performed by the MHL sink device using the location detection sensor (face detection sensor) or a remote controller and the correction process is performed by the MHL source device, for example, 5 bytes information (data row) shown in FIG. 23 is transmitted from the MHL sink device to the MHL source device. The MHL sink device (transmission source) transmits the 5 bytes information to the MHL source device by writing the information to the scratchpad register (Scratchpad Registers) of the MHL source device (destination to be transmitted) following the procedure shown in FIG. 16.

In the 5 bytes information shown in FIG. 23, in a first byte, an identifier "3D_ID_CODE (3D Adjust 1)" which shows that the information is 3D image correction information is disposed. In addition, in the 5 bytes information, information of a distance r is disposed in a second byte and information of the vertical angle θ1 (90° to −90°) is disposed in a third byte. Moreover, in the 5 bytes information, information of the traverse angle θ2 (90° to −90°) is disposed in a fourth byte and information of the torsion angle θ3 (90° to −90°) is disposed in a fifth byte.

The MHL source device which receives the 5 bytes information performs an image correction process which allows the 3D images to enter in an optimized state with respect to the location where the observer watches the image on the basis of the information of the distance r, the vertical angle θ1, the traverse angel θ2 and the torsion angle θ3. The MHL source device transmits the image data after the correction to the MHL sink device via the TMDS channel shown in FIG. 3.

In addition, reversely, a case where the input of the location information is performed by the MHL source device using the location detection sensor or the remote controller and the image correction process is performed by the MHL sink device may be also considered. In this case, the MHL source device transmits the 5 bytes information (data row) shown in FIG. 23 to the MHL sink device. In this case, the image data transmitted from the MHL source device via the TMDS channel is not corrected. Therefore, the MHL sink device performs the image correction process which allows the 3D images to enter in an optimized state with respect to the location where the observer watches the image on the basis of the information of the distance r, the vertical angle θ1, the traverse angel θ2 and the torsion angle θ3.

[Function of Detecting the Location of the Observer and Displaying Appropriate 3D Image: A Case of Direct-Viewing]

The present application is an application for, in particular, the direct-viewing system. Therefore, prior to the process, the MHL sink device notifies the MHL source device of that the 3D display system is the direct-viewing system.

Therefore, the MHL sink device notifies the MHL source device of the information by transmitting the 2 bytes information (data row) shown in FIG. 19, for example. Here, "Sink Class=010" is set and "direct-viewing" is displayed. The MHL sink device (transmission source) transmits the 2 bytes information to the MHL source device by writing the information to the scratchpad register (Scratchpad Registers) of the MHL source device (destination to be transmitted) following the procedure shown in FIG. 16. The MHL source device functions the present application in a case of the direct-viewing system.

Figure 24:
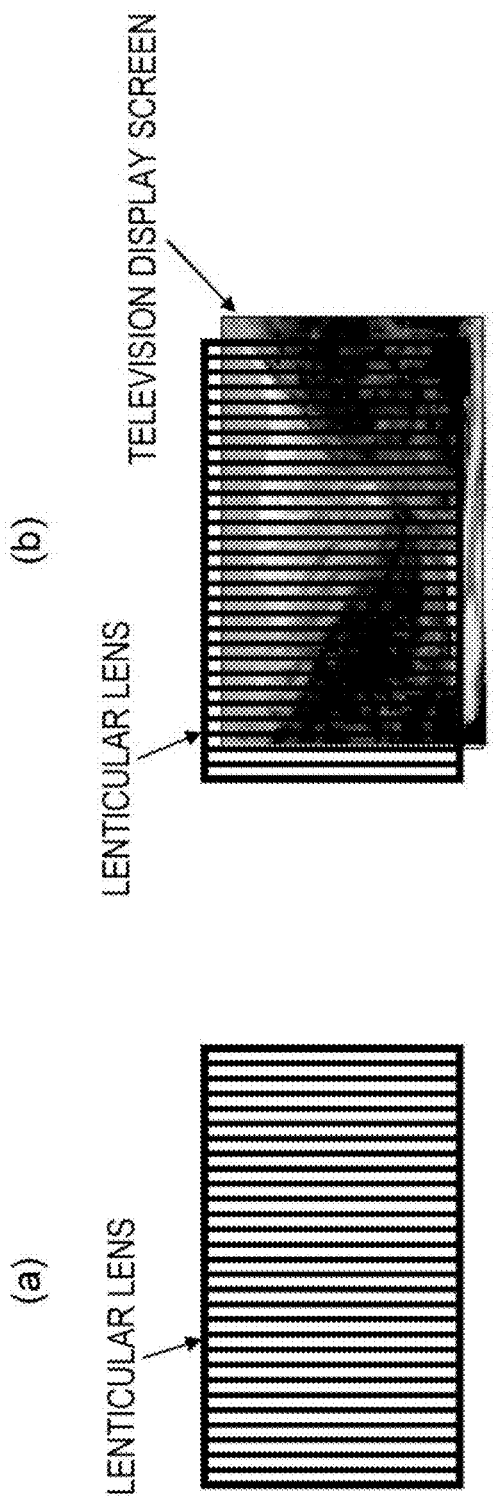
FIG. 24 is a diagram for explaining a structure of a lenticular system, one system of a direct viewing system.
Figure 25:
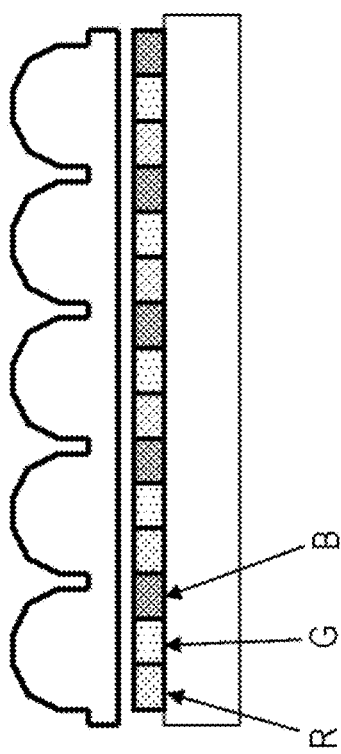
FIG. 25 is a diagram for explaining the structure of the lenticular system, one system of the direct viewing system.

FIG. 24 and FIG. 25 show a configuration of the lenticular system as one system of the direct-viewing system. In a case of the lenticular system, the lenticular lens shown in FIG. 24(a) is overlapped and disposed on the television display screen as shown in FIG. 24(b). The lenticular lens is formed to be even and uneven as shown in FIG. 25. The 3D display of the direct-viewing system is realized by overlapping the lenticular lens on the television screen and utilizing refraction when a light emitter on the television screen passes through the lenticular lens.

Figure 26:
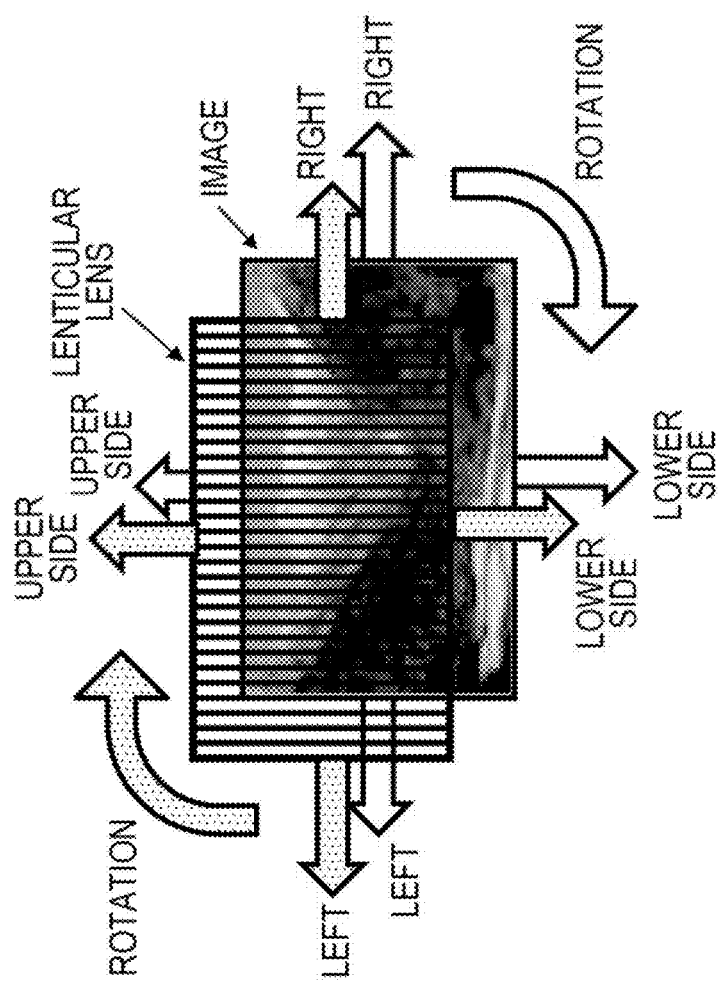
FIG. 26 is a diagram for explaining that in a case where 3D effect is optimized by the location of the observer in the direct viewing system, either lenticular lens or an image or both of the same is shifted in vertical and traverse directions or rotated.

Also in this case, in the same manner as the 3D glass system described above, the maximum 3D effect can be obtained when perpendicularly watching the television screen from the front. Here, in the same manner as the 3D glass system described above, also in the direct-viewing system, a case can be considered where the 3D effect is optimized according to the location of the observer. In this case, as shown in FIG. 26, by shifting either the images or the lenticular lens or both in the vertical and traverse directions or by rotating, it is possible to increase the 3D effect according to the location where the observer watched the images.

When the input of the location information is performed by the MHL source device using the location detection sensor (face detection sensor) or the remote controller and when the correction process is performed by the MHL sink device, for example, 8 bytes information (data row) shown in FIG. 27 is transmitted from the MHL source device to the MHL sink device. The MHL source device (transmission source) transmits the 8 bytes information to the MHL sink device by writing the information to the scratchpad register (Scratchpad Registers) of the MHL sink device (destination to be transmitted) following the procedure shown in FIG. 16.

In the 8 bytes information shown in FIG. 27, in a first byte, an identifier "3D_ID_CODE (3D Adjust 2)" which shows that the information is the 3D image correction information is disposed. Moreover, in the 8 bytes information, the information of the distance r is disposed in a second byte. Furthermore, in the 8 bytes information, the vertical shifted amount (+100% to −100%), the traverse shifted amount (+100% to −100%) and the torsion angle θ (90° to −90°) of the lenticular lens are disposed in a third byte, a fourth byte and a fifth byte. In addition, in the 8 bytes information, the vertical shifted amount (+100% to −100%), the traverse shifted amount (+100% to −100%) and the torsion angle θ (90° to 90°) of the images are disposed in a sixth byte, a seventh byte and an eighth byte.

The MHL sink device which receives the 8 bytes information performs a correction process in order to allow the 3D images to enter the optimized state with respect to the location where the observer watches the image on the basis of the information included therein. In this case, the MHL sink device performs shift and rotation processes with respect to either the lenticular lens or the television display screen or both of the same.

[3D Control of Closed Caption (Closed Caption) Display Location]

The closed caption (CC) is performed in the United States and is a subtitle display function which shows characters by synchronizing dialogues or effective sounds to the image on the screen of the television. In the closed caption, the characters or control information to be displayed is coded and is added to a specific track within package contents of broadcast waves, DVDs or the like.

The CC code received by the tuner of the television is decoded by a CC decoder of the television and is displayed on the television screen as the characters. At this time, the display location of the characters of the television screen may be changed by the remote controller of the television. As one example of an operation method, every time when pressing a location determination button on the remote controller at a time, the display location of CC is changed an upper right side to a lower right side to an upper left side to a lower left side in this order.

HDMI and MHL do not have a function to transmit the CC code as it is from the source device to the sink device. Therefore, for example, when the source device which has the tuner receives the broadcasting waves and the image is viewed in the sink device side or when the source device which has a DVD reproduction function is set to reproduce DVDs including the CC code, the CC code may not be transmitted to the sink device side as it is.

Therefore, the CC code is decoded by the cc decoder of the source device side and is transmitted to the sink device, via HDMI or MHL cable as the AV stream by developing the code as the characters on the screen (open caption). In this case, the display location of the characters on the screen is changed using the remote controller of the source side. In this case, if it is possible to change the display location using the remote controller of the sink side, that is, the television, it is convenient.

Figure 28:
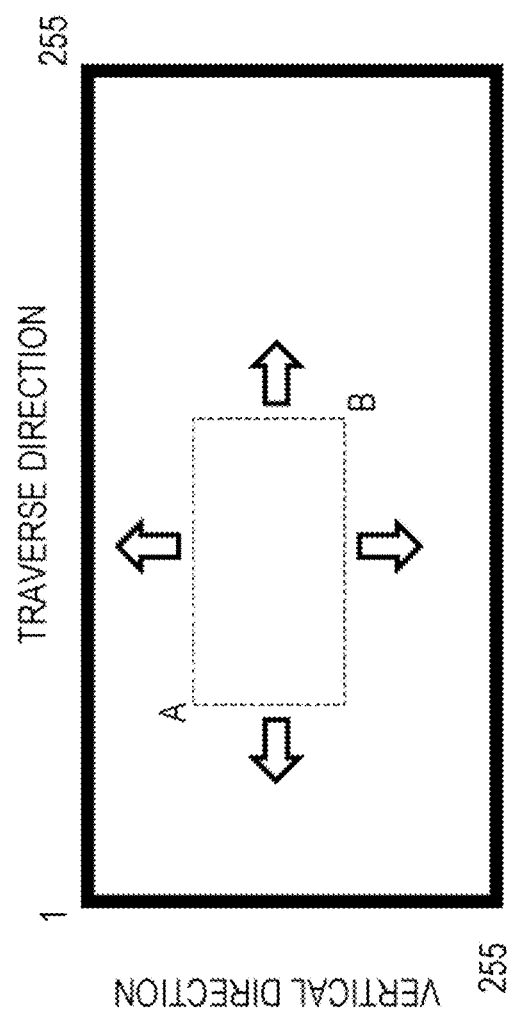
FIG. 28 is a diagram of a display frame of closed caption (CC) on a 2D screen.
Figure 29:
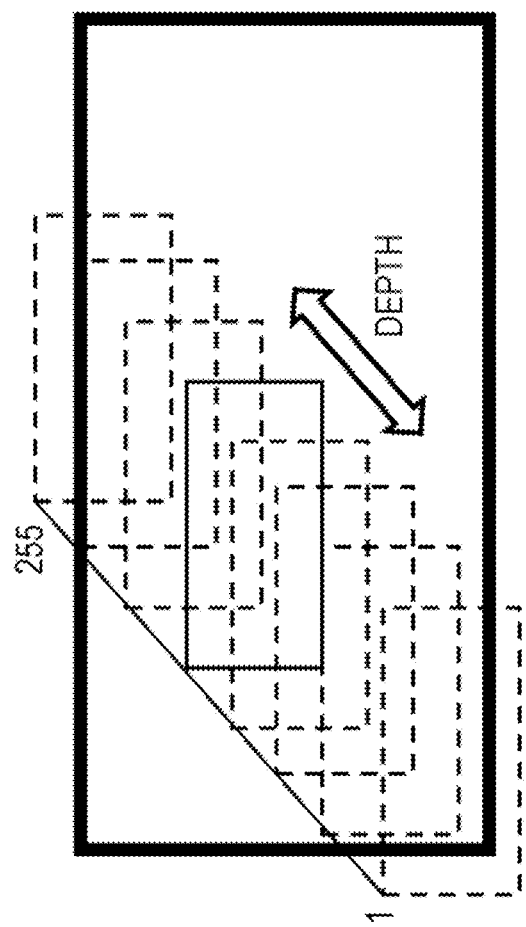
FIG. 29 is a diagram for explaining that three directions of a height, a width and a depth are designated as a location of the display frame of closed caption (CC) in a case of 3D.

The distance shown by a dashed line in FIG. 28, shows a CC display frame on the 2D screen in the related art. In this case, the dashed line designates two locations of the height and the width. In a case of 3D, as shown in FIG. 29, as the display location, the dashed line designates three of a depth in addition to the height and the width.

When the AV stream including the closed caption (CC) is transmitted from the MHL source device, the MHL sink device transmits 7 bytes information (data row) shown in FIG. 30, for example, to the MHL source device. The MHL sink device (transmission source) transmits the 7 byte information to the MHL source device by writing the information to the scratchpad register (Scratchpad Registers) of the MHL source device (destination to be transmitted) following the procedure shown in FIG. 16.

In the 7 bytes information shown in FIG. 30, in a first byte, an identifier "3D_ID_CODE (Closed Caption)" which shows that the information is the CC information is disposed. Moreover, in the 7 bytes information, information of the size (extra large, large, medium and small) of the characters is disposed in a second byte and information in the traverse direction (0 to 255) of a point A is disposed in a third bytes, information in the vertical direction (0 to 255) of the point A is disposed in a fourth byte. In addition, in the 7 bytes information, information in the traverse direction (o to 255) of a point B is disposed in a fifth byte and information in the vertical direction (0 to 255) of the point B is disposed in a sixth byte and information in the depth direction (0 to 255) of the points A and B is disposed in a seventh byte.

In addition, the meaning of each information included in the 7 bytes information shown in FIG. 30 is as below.

(1) Size of Characters: The size of the displayed characters is designated. There are four kinds such as extra large, large, medium and small.

(2) Traverse Direction of Point A: A traverse location of the upper left side is designated on a rectangular display frame shown by the dashed line in FIG. 28. When a value is 0, there is not designation. When the value is 1 to 255, a location from the left side when the width of the sink screen is divided into 254 parts is designated. For example, in a case of "1", a left side of the screen is designated as the location in the traverse direction of the point A and in a case of "255", a right side of the screen is designated as the location in the traverse direction of the point A.

(3) Vertical Direction of Point A: A vertical location of the upper left of the rectangular display frame shown by the dashed line in FIG. 28 is designated when a value is 0, there is not designation. When the value is 1 to 255, a location from an upper portion is designated when the width of the sink screen is divided into 254 parts. For example, in a case of "1", an upper side of the screen is designated as the location in the vertical direction of the point A and in a case of "255", a lower side of the screen is designated as the location in the vertical and travers direction of the point A.

(4) Traverse Direction of Point B: A traverse location of the upper right side is designated on a rectangular display frame shown by the dashed line in FIG. 28. When a value is 0, there is not designation. When the value is 1 to 255, a location from the left side when the width of the sink screen is divided into 254 parts is designated. For example, in a case of "1", a left side of the screen is designated as the location in the traverse direction of the point B and in a case of "255", a right side of the screen is designated as the location in the traverse direction of the point B.

(5) Vertical Direction of Point B: A vertical location of the lower right of the rectangular display frame shown by the dashed line in FIG. 28 is designated when a value is 0, there is not designation. When the value is 1 to 255, a location from an upper portion is designated when the width of the sink screen is divided into 254 parts. For example, in a case of "1", an upper side of the screen is designated as the location in the vertical direction of the point B and in a case of "255", a lower side of the screen is designated as the location in the vertical direction of the point B.

(6) Depth of Display Frame AB: a depth location of a rectangular display frame AB shown by the dashed line in FIG. 29 is designated. When the value is 0, there is not designation. When the value is 1 to 255, a location from a forefront portion is designated when the depth of the sink screen is divided into 254 parts. For example, in a case of "1", the forefront portion of the screen is designated as the location of the depth of the rectangular display frame AB and in a case of "255", a backmost portion of the screen is designated as the location of the depth of the rectangular display frame AB.

The MHL source device which receives the 7 bytes information develops (open caption) the characters inside the rectangular frame AB in which the designated location and the depth are included with the designated character size on the basis of the information included therein. The MHL source device transmits the information to the MHL sink device through the TMDS channel as the AV stream. Since closed caption (CC) is developed in the AV stream in advance, the MHL sink device is not necessary to decode the CC code and the image may be displayed as it is.

In the image display system 10 shown in FIG. 1 and FIG. 2, the transmission of the 3D information between the devices is performed using the capability register (Capability Registers) or the scratchpad register (Scratchpad Registers) of MHL. Therefore, it is possible to efficiently transmit the 3D information at high speed.

For example, in comparison with the case of HDMI, it is possible to efficiently transmit the 3D capability of the MHL sink device to the MHL source device at high speed. As a result, since improvement of the response and reduction of battery power consumption can be realized with respect to mobile devices which are driven by batteries and of which performances of CPUs are low, it is extremely effective to the above. The described above also matches a gist of MHL Standards in which the use of the mobile devices is premised. Moreover, using various registers of the MHL devices, since the data transmission between the sink and the source in mutual directions is performed, detailed various 3D processes which are may not be performed in HDMI devices can be realized.

[2. Modifications]

Figure 31:
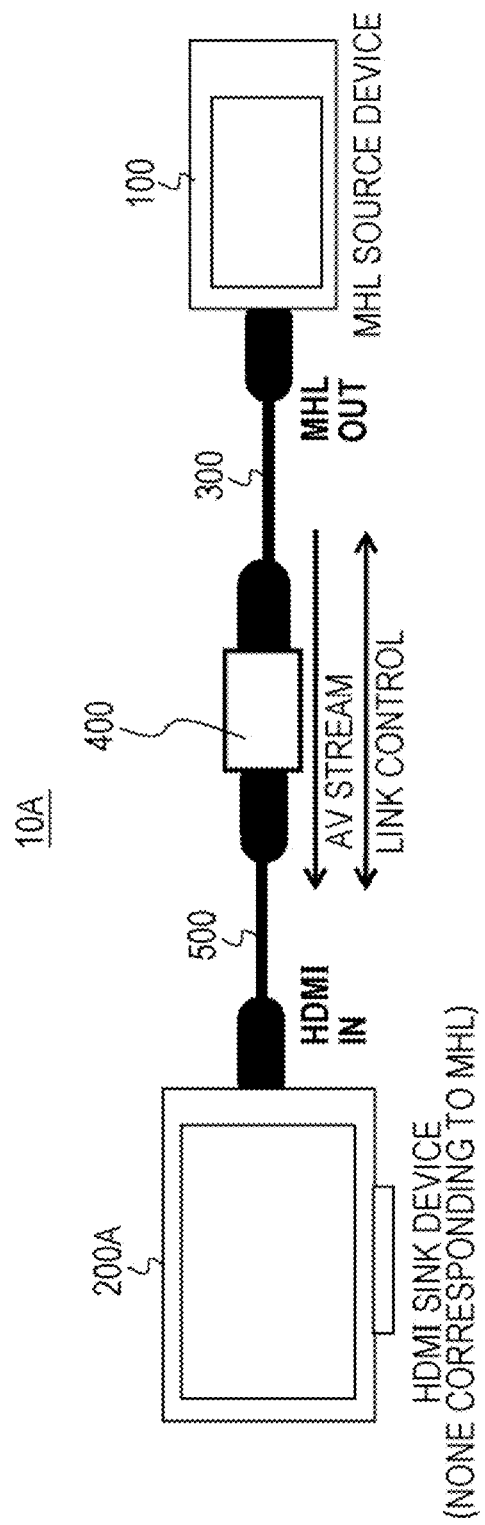
FIG. 31 is a block diagram of a configuration example of an image display system in a case where a television receiver is incompatible to MHL.

Here, the image display system 10 according to the embodiment shows an example in which the television receiver 200 is the MHL sink device as shown in FIG. 1. However, also in an image display system 10A shown in FIG. 31, the present invention can be applied in the same manner. In the image display system 10A, the mobile phone 100 and the MHL dongle 400 are connected to each other by the MHL cable 300. Moreover, the MHL dongle 400 and the television receiver 200A are connected to each other by a HDMI cable 500. The MHL dongle 400 performs a conversion process of MHL-HDMI.

In the image display system 10A, the television receiver 200A is compatible for HDMI, however, is incompatible for MHL. In the image display system 10A, the AV stream from the mobile phone 100 is input to an HDMI Input terminal of the television television receiver 200A after being converted from MHL into HDMI using the MHL dongle 400.

In addition, according to the present embodiment described above, an example that the MHL source device is the mobile phone 100 and the MHL sink device is the television receiver 200 is shown. However, combination of the MHL source device and the MHL sink device is not limited to the above. Even in the case thereof, it is possible to efficiently transmit the 3D information between the devices using the capability register, the scratchpad register or the like of MHL at high speed and detailed control can be performed by performing transmitting the 3D information between the devices.

Moreover, even though it is not mentioned above, the 3D structure and the video format of the 3D image data transmitted from the MHL source device to the MHL sink device can be transmitted from the MHL source device to the MHL sink device using the scratchpad register. The transmission method is performed in the same manner as the transmission using the scratchpad register of various 3D information described above and therefore, the description thereof is omitted.

In the present embodiment, the closed caption is shown as the subtitles, to other subtitles, for example, subtitles of DVB, subtitles of ARIB or the like, the present invention can be applied.

INDUSTRIAL APPLICABILITY

The present invention can be applied to, for example, electronic devices which constitute an image display system for displaying 3D images.

REFERENCE SIGNS LIST 10, 10A IMAGE DISPLAY SYSTEM
100 MOBILE PHONE
101 CONTROL UNIT
102 USER OPERATION UNIT
103 DISPLAY UNIT
104 3G/4G MODEM UNIT
105 CAMERA UNIT
106 RECORDING REPRODUCTION UNIT
107 TRANSMISSION PROCESS UNIT
108 MHL TRANSMISSION UNIT
109 MHL TERMINAL
200, 200A TELEVISION RECEIVER
201 CONTROL UNIT
202 USER OPERATION UNIT
203 MHL TERMINAL
204 MHL RECEIVING UNIT
205 TUNER
206 ANTENNA TERMINAL
207 CONVERSION UNIT
208 DISPLAY PROCESS UNIT
209 DISPLAY PANEL
300 MHL CABLE

400 MHL DONGLE
500 HDMI CABLE

The invention claimed is:

1. An electronic device, comprising:
   a register to which function information is written in advance;
   a change notification transmission unit configured to, in an event of a change in stereoscopic image information written in the register, transmit change notification to an external device by use of a write burst command;
   a read command receiving unit configured to receive a read command and address information of the stereoscopic image information in the register, transmitted from the external device, based on the transmission of the change notification transmitted from the change notification transmission unit; and
   a stereoscopic image information transmission unit configured to read the stereoscopic image information from the address in the register that corresponds to the address information received in the read command receiving unit and transmit data packets that correspond to the stereoscopic image information to the external device by use of the write burst command in a first transmission,
   wherein in an event size of the stereoscopic image information exceeds a threshold size, the stereoscopic image information transmission unit is configured to transmit remaining data packets that correspond to the stereoscopic image information to the external device in a subsequent transmission after reception of address information of the remaining data packets that correspond to the stereoscopic image information.

2. The electronic device according to claim 1, wherein the stereoscopic image information includes information of a structure and a video format of stereoscopic image data which can be managed.

3. The electronic device according to claim 1, wherein the stereoscopic image information transmission unit is further configured to transmit the data packets that correspond to the stereoscopic image information of less than or equal to the threshold size to the external device by use of the write burst command in the first transmission.

4. A method for transmitting stereoscopic image information, the method comprising:
   transmitting change notification to an external device using a write burst command, in an event of a change in stereoscopic image information written in a register to which function information is written in advance;
   receiving a read command and address information of the stereoscopic image information in the register, from the external device, based on the transmission of the change notification; and
   transmitting data packets corresponding to the stereoscopic image information, read from the address in the register corresponding to the address information received in the read command using the write burst command in a first transmission,
   wherein in an event size of the stereoscopic image information exceeds a threshold size, remaining data packets corresponding to the stereoscopic image information are transmitted to the external device in a subsequent transmission after reception of address information of the remaining data packets corresponding to the stereoscopic image information.

5. An electronic device, comprising:
   a change notification receiving unit configured to receive, by use of a write burst command, change notification of stereoscopic image information notified from an external device that has a register to which function information is written in advance,
   wherein a value present in a register of the electronic device is set based on the received change notification;
   a read command transmission unit configured to transmit a read command and address information of the stereoscopic image information in the register to the external device, based on the change notification received in the change notification receiving unit; and
   a stereoscopic image information receiving unit configured to receive, in a first transmission from the external device, data packets that correspond to the stereoscopic image information, read and transmitted from the register in the external device that corresponds to the read command and the address information of the stereoscopic image information transmitted from the read command transmission unit,
   wherein in an event size of the stereoscopic image information exceeds a threshold size, the stereoscopic image information receiving unit is configured to receive remaining data packets that correspond to the stereoscopic image information in a subsequent transmission from the external device after transmission of address information of the remaining data packets that correspond to the stereoscopic image information.

6. A method for receiving stereoscopic image information, the method comprising:
   receiving, using a write burst command, a change notification of stereoscopic image information from an external device having a register to which function information is written in advance,
   wherein a value present in a register of the electronic device is set based on the received change notification;
   transmitting a read command and address information of the stereoscopic image information in the register, to the external device, based on the received change notification; and
   receiving, in a first transmission from the external device, data packets corresponding to the stereoscopic image information, which is read and transmitted from the register of the external device, corresponding to the read command and the address information of the stereoscopic image information transmitted to the external device,
   wherein in an event size of the stereoscopic image information exceeds a threshold size, remaining data packets corresponding to the stereoscopic image information are received in a subsequent transmission from the external device after transmitting address information of the remaining data packets corresponding to the stereoscopic image information.

* * * * *